US008650374B2

(12) United States Patent
Kito et al.

(10) Patent No.: US 8,650,374 B2

(45) Date of Patent: Feb. 11, 2014

(54) STORAGE SYSTEM

(75) Inventors: Daisuke Kito, Machida (JP); Kenji Fujii, Yokohama (JP); Yasunori Kaneda, Yokohama (JP); Masato Arai, Yokohama (JP)

(73) Assignee: Hitachi Ltd., Tokyo (JP)

( * ) Notice: Subject to any disclaimer, the term of this patent is extended or adjusted under 35 U.S.C. 154(b) by 237 days.

(21) Appl. No.: 12/983,374

(22) Filed: Jan. 3, 2011

(65) Prior Publication Data

US 2011/0099331 A1 Apr. 28, 2011

Related U.S. Application Data

(63) Continuation of application No. 11/475,971, filed on Jun. 28, 2006, now Pat. No. 7,886,121.

(30) Foreign Application Priority Data

May 8, 2006 (JP) ................................ 2006-128847

(51) Int. Cl.
*G06F 12/08* (2006.01)

(52) U.S. Cl.
USPC ..... 711/163; 711/117; 711/154; 711/E12.043

(58) Field of Classification Search
None
See application file for complete search history.

(56) References Cited

U.S. PATENT DOCUMENTS

| | | | | |
|---|---|---|---|---|
| 5,956,028 | A * | 9/1999 | Matsui et al. | 715/757 |
| 7,127,445 | B2 * | 10/2006 | Mogi et al. | 1/1 |
| 2003/0110188 | A1 * | 6/2003 | Howard et al. | 707/200 |
| 2003/0229645 | A1 * | 12/2003 | Mogi et al. | 707/102 |
| 2005/0165787 | A1 | 7/2005 | Kaneda et al. | |
| 2006/0062383 | A1 | 3/2006 | Kaneda et al. | |
| 2007/0260806 | A1 | 11/2007 | Kito et al. | |

FOREIGN PATENT DOCUMENTS

EP 1647880 A1 4/2006

* cited by examiner

*Primary Examiner* — Charles Rones
*Assistant Examiner* — Ryan Dare
(74) *Attorney, Agent, or Firm* — Brundidge & Stanger, P.C.

(57) ABSTRACT

In a computer system including a plurality of data storage apparatuses and a management computer, a given data storage apparatus, upon receipt of a control request for a local data storage apparatus from a management computer, accesses the hierarchical relation information between the storage areas in the local data storage apparatus and the storage areas of the other data storage apparatuses, and in the case where a storage area in the local data storage apparatus is set to correspond to a level lower than the other data storage apparatuses, transmits an approval request to the other data storage apparatuses. The given data storage apparatus, upon receipt of the approval from the other data storage apparatuses, executes the control request of the management computer.

16 Claims, 15 Drawing Sheets

FIG.6A 245a 245b 245c

| TOTAL STORAGE AREA NUMBER | MANAGEMENT I/F IDENTIFICATION NO. | IDENTIFIER |
|---|---|---|
| 3 | 220 | ABC.XX200.0123.211 |
| | | ABC.XX200.0123.212 |
| | | ABC.XX200.0123.213 |

| TOTAL STORAGE AREA NUMBER | MANAGEMENT I/F IDENTIFICATION NO. | IDENTIFIER |
|---|---|---|
| 3 | 120 | DEF.YY100.0456.111 |
| | | DEF.YY100.0456.112 |
| | | DEF.YY100.0456.113 |

| TOTAL STORAGE AREA NUMBER (246a) | STORAGE AREA IDENTIFIER (246b) | STORAGE AREA CONTROL LEVEL (246c) | LOWER STORAGE AREA EXISTENCE FLAG (246d) | LOWER STORAGE AREA IDENTIFIER (246e) | UPPER STORAGE AREA EXISTENCE FLAG (246f) | UPPER STORAGE AREA IDENTIFIER (246g) |
|---|---|---|---|---|---|---|
| 3 | ABC.XX200.0123.211 | | 0 | | 0 | |
| | ABC.XX200.0123.212 | 1 | 1 | DEF.YY100.0456.111 | 0 | |
| | ABC.XX200.0123.213 | 2 | 2 | DEF.YY100.0456.112 | 0 | |

FIG.7B

| TOTAL STORAGE AREA NUMBER (146a) | STORAGE AREA IDENTIFIER (146b) | STORAGE AREA CONTROL LEVEL (146c) | LOWER STORAGE AREA EXISTENCE FLAG (146d) | LOWER STORAGE AREA IDENTIFIER (146e) | UPPER STORAGE AREA EXISTENCE FLAG (146f) | UPPER STORAGE AREA IDENTIFIER (146g) |
|---|---|---|---|---|---|---|
| 3 | DEF.YY100.0456.111 | 1 | 0 | | 1 | ABC.XX200.0123.211 |
| | DEF.YY100.0456.112 | 2 | 0 | | 2 | ABC.XX200.0123.212 |
| | DEF.YY100.0456.113 | | 0 | | 0 | |

148 ACCOUNT INFORMATION

| USER ID (901) | PASS WORD (902) | ROLE (903) |
|---|---|---|
| abc | aaa | ACCOUNT MANAGEMENT |
| xyz | bbb | AUDIT |
| ef | cde | UPPER |
| lmm | xxx | LOWER |
| g300 | yyy | APPROVAL |
| h1000 | zzz | UPPER, APPROVAL |

ROLE DEFINITION INFORMATION 1001 1002a 1002 1002b 1003a 1003 1003b 1004a 1004 1004b 1005a 1005 1005b 1006

| ROLE NAME | OPERATION FOR STORAGE AREA NOT COVERED BY UPPER DATA STORAGE APPARATUS | | OPERATION FOR STORAGE COVERED BY UPPER DATA STORAGE APPARATUS | | OPERATION FOR LOG SETTING INFORMATION | | OPERATION FOR ACCOUNT INFORMATION | | APPROVAL OPERATION FOR LOWER DATA STORAGE APPARATUS |
|---|---|---|---|---|---|---|---|---|---|
| | UP-DATE | REFER-ENCE | UPDATE | REFER-ENCE | UPDATE | REFER-ENCE | UP-DATE | REFER-ENCE | PROHIBIT |
| UPPER ROLE | PRO-HIBIT | PRO-HIBIT | PERMIT | PERMIT | PRO-HIBIT | PRO-HIBIT | PRO-HIBIT | PRO-HIBIT | PROHIBIT |
| LOWER ROLE | PER-MIT | PER-MIT | PERMIT (STORAGE AREA CONTROL LEVEL 1) | PERMIT (STORAGE AREA CONTROL LEVEL 1) | AP-PROVAL RE-QUIRED | PER-MIT | PRO-HIBIT | PRO-HIBIT | PROHIBIT |
| | | | APPROVAL REQUIRED (STORAGE AREA CONTROL LEVEL 2) | PERMIT (STORAGE AREA CONTROL LEVEL 2) | | | | | |
| | | | PROHIBIT (STORAGE AREA CONTROL LEVEL 3) | PERMIT (STORAGE REA CONTROL LEVEL 3) | | | | | |
| | | | PROHIBIT (STORAGE AREA CONTROL LEVEL 4) | PROHIBIT (STORAGE AREA CONTROL LEVEL 4) | | | | | |
| ACCOUNT MANAGE-MENT ROLE | PRO-HIBIT | PRO-HIBIT | PRO-HIBIT | PRO-HIBIT | PRO-HIBIT | PRO-HIBIT | PER-MIT | PER-MIT | PROHIBIT |
| AUDIT ROLE | PRO-HIBIT | PER-MIT | PRO-HIBIT | PER-MIT | PRO-HIBIT | PER-MIT | PRO-HIBIT | PER-MIT | PROHIBIT |
| AP-PROVAL ROLE | PRO-HIBIT | PER-MIT | PRO-HIBIT | PRO-HIBIT | PRO-HIBIT | PRO-HIBIT | PRO-HIBIT | PRO-HIBIT | PERMIT |

155

ACCESS CONTROL INFORMATION 1501 1502

| UPPER DATA STORAGE APPARATUS NAME | LOWER DATA STORAGE APPARATUS IP ADDRESS |
|---|---|
| ABC.XX200.0123 | xxx.xxx.xxx.1 |
| DEF.YY100.0456 | xxx.xxx.xxx.10 |

STORAGE SYSTEM

CROSS-REFERENCED TO RELATED APPLICATIONS

The present application is a continuation of application Ser. No. 11/475,971, filed Jun. 28, 2006 now U.S. Pat. No. 7,886, 121; which claims priority from Japanese application JP2006-128847 filed on May 8, 2006, the content of which is hereby incorporated by reference into this application.

BACKGROUND OF THE INVENTION

This invention relates to a technique for managing a plurality of data storage apparatuses of a computer system, or in particular to a technique for managing the data storage apparatuses hierarchically connected.

With the increase in the amount of digital data held by companies, a storage area network for connecting the data storage apparatuses to each other or data storage apparatuses to a computer by an exclusive network (mainly fiber channel) has come to spread. In order to efficiently manage the data ever on the increase, on the other hand, a technique is available in which the storage areas of a plurality of data storage apparatuses are virtualized and supplied to a computer as one or a plurality of virtual storage areas.

As shown in JP-A-2005-208967, for example, a plurality of data storage apparatuses are hierarchized and connected to a computer. In a computer system having the data storage apparatuses in hierarchical configuration, a given data storage apparatus can virtualize the storage area of another data storage apparatus and supply it to the computer as one or a plurality of virtual storage areas. In the case where the operation is performed to change the configuration of the data storage apparatuses such as to delete the storage area supplied by a data storage apparatus in this system, a manager is required to recognize the particular configuration. This is by reason of the fact that assuming that the manager deletes the storage area of a lower data storage apparatus without recognizing the hierarchical configuration of the data storage apparatuses, for example, the storage area of an upper data storage apparatus hierarchically related to the particular lower data storage apparatus may also be deleted. In this computer system having the data storage apparatuses having a hierarchical configuration, a technique is provided to prevent the manager from performing the erroneous operation on a storage area without recognizing the hierarchical configuration of the data storage apparatuses.

The methods of managing the data storage apparatuses include a method, like JP-A-2005-208967, in which an exclusive console provided by software or a program installed in advance in a management computer is used by the manager to manage the data storage apparatuses, and a method in which the manager manages the data storage apparatuses using an individual console of a management computer not installed with the particular software or program without an exclusive console provided by the software or the program.

According to the technique of JP-A-2005-208967, the manager engaged in managing the data storage apparatuses from a console supplied by an exclusive software or program for management of the data storage apparatuses can be informed of the hierarchical relation of the data storage apparatuses and therefore can prevent the erroneous operation on the storage area which otherwise might be caused by the failure to recognize the hierarchical configuration of the storage areas on the part of the manager.

SUMMARY OF THE INVENTION

In the technique of JP-A-2005-208967, assume that the manager manages the data storage apparatuses from an individual console without using the console supplied by the exclusive software or program for management of the data storage apparatuses. The manager would not be informed of the hierarchical relation of the data storage apparatuses and therefore could not avoid the erroneous operation.

Also, in the case where the manager of an upper data storage apparatus and the manager of a lower data storage apparatus are different from each other in a computer system having the data storage apparatuses in a hierarchical configuration, the operation on the storage area by the manager of the lower data storage apparatus may be different from the operation intended by the manager of the upper data storage apparatus. Assuming that the manager of the lower data storage apparatus deletes the storage area of a lower data storage apparatus without recognizing the hierarchical configuration of the data storage apparatuses, for example, the storage area of an upper data storage apparatus hierarchically related to the particular lower data storage apparatus may also be deleted.

In the case where the storage area of the upper data storage apparatus actually holds no data while the data is stored in the storage area of the lower data storage apparatus in virtual form, the particular storage area, though managed by the manager of the upper data storage apparatus, exists in the lower data storage apparatus and therefore can be managed also by the manager of the lower data storage apparatus, with the result that the particular storage area may be erroneously deleted.

In view of the points described above, the object of this invention is to provide a computer system including data storage apparatuses in hierarchical configuration, wherein the managers capable of managing the data storage apparatuses are appropriately limited taking the hierarchical configuration of the data storage apparatuses into consideration.

According to this invention, there is provided a computer system having a plurality of data storage apparatuses and a management computer, wherein a given data storage apparatus, upon receipt of a control request for the local data storage apparatus from the management computer, accesses the information on the hierarchical relation between the storage area of the local data storage apparatus and the storage area of other data storage apparatuses, and in the case where the storage area of the local data storage apparatus is associated with a lower level than the other data storage apparatuses, transmits an approval request to the other data storage apparatuses. Then, the given data storage apparatus, upon receipt of an approval from the other data storage apparatuses, executes the control request from the management computer.

The data storage apparatus has the authorization definition information for setting the correspondence between the role of the manager (hereinafter referred to simply as the role) and the operational authorization and, upon receipt of a control request for the local data storage apparatus from the manager through an input means of the management computer, grants or rejects the control request of the manager based on the authorization definition information.

In the computer system including the data storage apparatuses having a hierarchical configuration according to this invention, the erroneous operation of a manager other than an authorized manager is prevented for the storage area of the data storage apparatuses having the hierarchical configuration.

Other objects, features and advantages of the invention will become apparent from the following description of the embodiments of the invention taken in conjunction with the accompanying drawings.

BRIEF DESCRIPTION OF THE DRAWINGS

FIG. 6A is a diagram showing an example of the storage area information 245 according to the first and second embodiments.

FIG. 6B is a diagram showing an example of the storage area information 145 according to the first and second embodiments.

FIG. 7A is a diagram showing an example of the hierarchy information 246 according to the first and second embodiments.

FIG. 7B is a diagram showing an example of the hierarchy information 146 according to the first and second embodiments.

FIG. 10 is a diagram showing an example of the role definition information according to the first and second embodiments.

DETAILED DESCRIPTION OF THE INVENTION

This invention is explained below with reference to first and second embodiments. These embodiments are an example of the invention, and the invention is not limited to these embodiments.

[First Embodiment]

The first embodiment is explained below with reference to FIGS. 1 to 12.

In the management of a computer system having data storage apparatuses in a hierarchical configuration, in order to limit the managers capable of managing the storage areas of the lower data storage apparatus, it is necessary to grasp the hierarchical relation between the storage areas of the data storage apparatuses and to manage the right to access the storage areas in accordance with the hierarchical relation between the data storage apparatuses.

The hierarchization of data storage apparatuses is defined as a state in which a plurality of data storage apparatuses are connected to each other in multiple levels as viewed from the computer.

<Outline>

An outline of the first embodiment is explained below with reference to FIG. 1.

Figure 1:
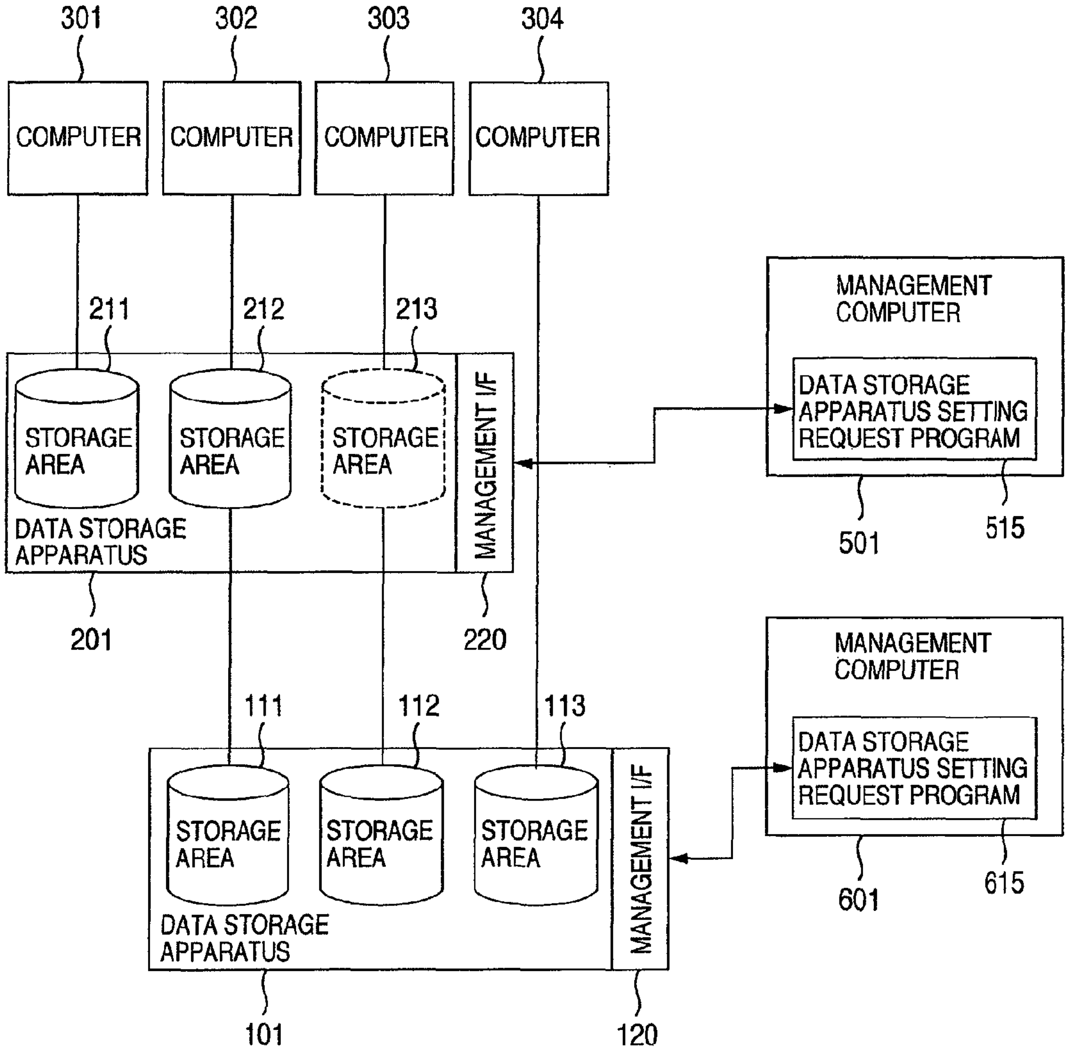
FIG. 1 is a diagram for explaining an outline of a first embodiment.

As shown in FIG. 1, the computer system according to this embodiment includes a plurality of hierarchized data storage apparatuses. In this case, four computers 301 to 304, one data storage apparatus 201 making up a first hierarchical level and one data storage apparatus 101 making up a second hierarchical level are shown.

The data storage apparatus making up the first hierarchical level has only storage areas directly recognizable by the computer, while the data storage apparatus making up the second hierarchical level has storage areas recognizable by the computer through the data storage apparatus making of the first hierarchical level. In the hierarchical configuration of the data storage apparatuses described hereinafter, the term "upper" indicates a level relatively near to the computer, and the term "lower" a level relatively distant from the computer. In this embodiment, although the hierarchical configuration of two levels is explained, the hierarchy may have a multiplicity of levels.

The computer 301 can recognize the storage area 211 supplied by the data storage apparatus 201. The storage area 211 supplied by the data storage apparatus 201 responds to the data read request or the data write request from the computer 301. The storage area 211 holds the program used by the computer 301 and the data used by the particular program and the data generated.

In similar fashion, the computer 302 can recognize the storage area 212 supplied by the data storage apparatus 201, and the storage area 212 responds to the data read request and the data write request from the computer 302. Also, the computer 302 can recognize the storage area 111 supplied by the data storage apparatus 101, through the data storage apparatus 201, and the storage area 111 responds to the data read request and the data write request from the computer 302 through the data storage apparatus 201. The storage area 212 and the storage area 111 both hold the data.

The computer 303 can recognize the storage area 213 supplied by the data storage apparatus 201, and the storage area 213 responds to the data read request and the data write request from the computer 303. Also, the computer 303 can recognize the storage area 112 supplied by the data storage apparatus 101, through the data storage apparatus 201, and the storage area 112 responds to the data read request and the data write request from the computer 303 through the data storage apparatus 201. According to this embodiment, the storage area 213 is a virtualized storage area holding no data, and the actual data is stored in the storage area 112. So the storage area 213 is indicated by dashed lines.

The computer 304 can recognize the storage area 113 supplied by the data storage apparatus 101, and the storage area 113 responds to the data read request and the data write request from the computer 304. The storage area 113 holds the program used by the computer 304 and the data used by the particular program and the data generated.

The data storage apparatuses 101, 102 of the computer system shown in FIG. 1 include management interfaces 120, 220, respectively. The data storage apparatuses 101, 201 are connected to management computers 501, 601, respectively, through the management interfaces 120, 220.

The management computer 501 has a data storage apparatus setting request program 515 for issuing a setting request to the data storage apparatus 201 in cooperation with the data storage apparatus 201 connected to the management computer 501. The management computer 601 has a data storage apparatus setting request program 615 for issuing a setting request to the data storage apparatus 101 in cooperation with the data storage apparatus 101 connected to the management computer 601. The manager of the lower data storage apparatus 101, for example, sends a management operation execution request to the storage area 113 of the data storage apparatus 101 through a management I/F 120 using the data storage apparatus setting request program 615 of the management computer 601. The data storage apparatus 101 determines whether the storage area constituting an object of operation of the data storage apparatus 101 has a hierarchical relation with the upper data storage apparatus 201 and the operation has an effect on the upper data storage apparatus or not and whether the manager is authorized or not to operate the particular storage area. The data storage apparatus 101 thus executes the operation in the case where the manager is authorized to operate the particular storage area and rejects to execute the operation in the case where the manager is not authorized to operate the storage area.

As a result, the manager of the lower data storage apparatus is prevented from executing the erroneous or illegal operation of the lower data storage apparatus affecting the upper data storage apparatus. A novel configuration for realizing this function is mainly explained in detail below.

<System Configuration>

Figure 2:
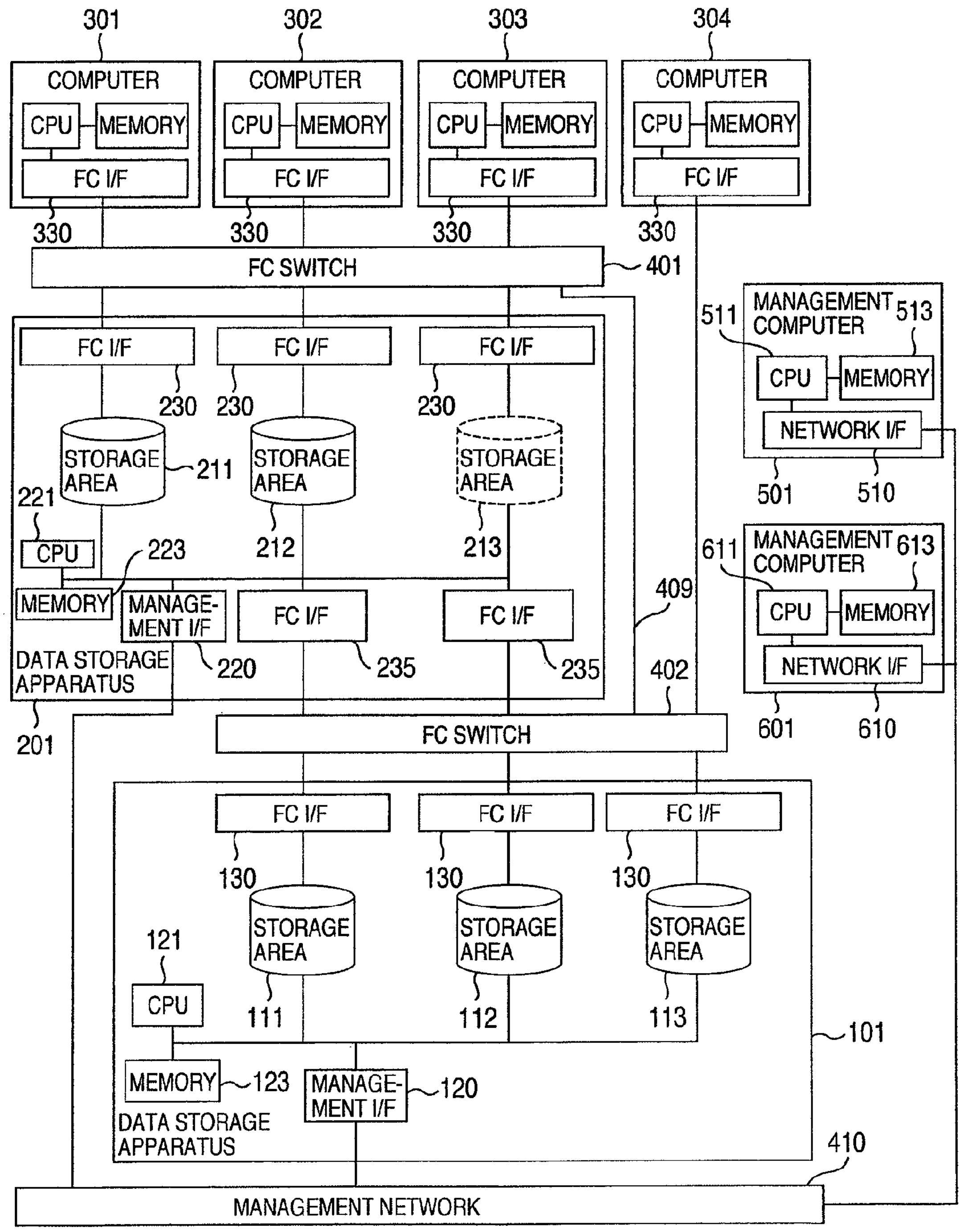
FIG. 2 is a diagram showing a system configuration according to the first embodiment.

FIG. 2 shows a system configuration according to this embodiment.

The computer system according to this embodiment includes computers 301, 302, 303, 304, data storage apparatuses 101, 201, management computers 501, 601, and fiber channel switches (hereinafter referred to as the FC switches) 401, 402 connecting the computers 301 to 304 and the data storage apparatuses 101, 201.

The computers 301 to 303 are connected to the data storage apparatus 201 through the FC switch 401. The computer 304 is connected to the data storage apparatus 101 through the FC switch 402.

The computers 301 to 304 each include a CPU 310, a memory 320 and a fiber channel interface (hereinafter referred to as the FC interface) 330. The memory 320 holds the program executed by the CPU 310, the data read by the data storage apparatus and the data to be written into the data storage apparatus. The computers 301 to 304 are connected to the FC switches 401, 402 through the FC interface 330.

The data storage apparatus 201 has three FC interfaces 230 for connection to the FC switch 401. The FC interfaces 230 are arranged in the number corresponding to the number of the computers connected through the FC switch 401. The data storage apparatus 201 receives a read/write request from the computer through the FC interface 230, returns the requested data from the corresponding storage area, and writes the received data in the storage area. The FC interfaces 230 are not limited to 3 but may be plural number.

The data storage apparatus 201 has the storage areas 211, 212 for holding the data used by the computer. Further, the data storage apparatus 201 has two FC interfaces 235 for connection with other data storage apparatuses. The FC interfaces are provided in the number corresponding to the number of other data storage apparatuses connected thereto. The FC interfaces 235 are not limited to 2 in number but may be more than 2.

Further, though not shown, the data of the storage area 212 and the storage area 111 are assumed to be synchronized with each other. The storage area 213, as described later, is a virtualized version of the storage area 113 and therefore indicated by dashed lines.

The data storage apparatus 201 is further connected to one another data storage apparatus 101 through the FC switch 402.

The data storage apparatus 101 includes FC interfaces 130 for connection to the FC switch 402.

The data storage apparatus 101 includes a storage area 111 for storing a copy of the data stored in the storage area 212 in the data storage apparatus 201, a storage area 112 for storing the data used by the computer 303 through the data storage apparatus 201, and a storage area 113 for holding the data used by the computer 304.

The data storage apparatuses 101, 201 include management interfaces 220, 120 for connection to the management network 410, CPUs 221, 121 for controlling the program stored in the data storage apparatuses 101, 201 and the management interface, and memories 223, 123 for holding the program executed by the CPUs 221, 121 and the data transmitted/received by the management interfaces 220, 120. The data storage apparatuses 101, 201 are connected to the management computers 501, 601 through the management network 410.

The management computer 501 includes the network interface 510 for connecting to the management network 410, the CPU 511 for internal processing of the management computer 501, and the memory 513 for holding the program executed by the CPU 511 and the data transmitted and received by the network interface 510.

The manager can request the data storage apparatus 201 to create or delete a storage area or to execute the operation of managing the configuration and the state of the data storage apparatus 201 using the data storage apparatus setting request program, described later, on the management computer 501.

The management computer 601 includes the network interface 610 for connection to the management network 410, the CPU 611 for internal processing of the management computer 601, and the memory 613 for holding the program executed by the CPU 611 and the data transmitted and received by the network interface 610.

The manager can request the data storage apparatus 101 to create or delete a storage area or to execute the operation of managing the configuration and the state of the data storage apparatus 101 using the data storage apparatus setting request program 515, described later, on the management computer 601.

Figure 3A:
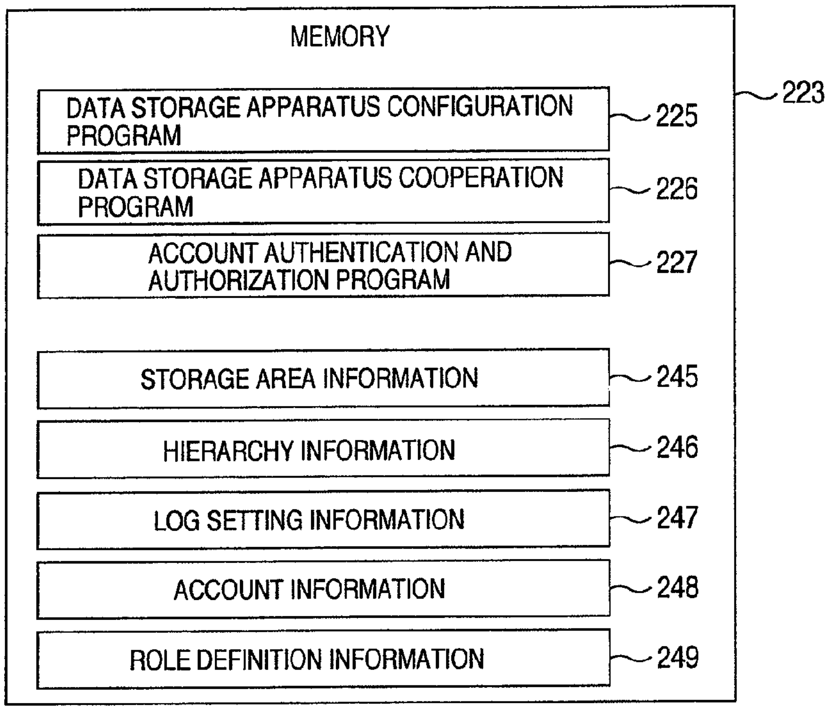
FIG. 3A is a diagram showing an example of the program and the data held in a memory 223 of a data storage apparatus 201 according to the first embodiment.
Figure 3B:
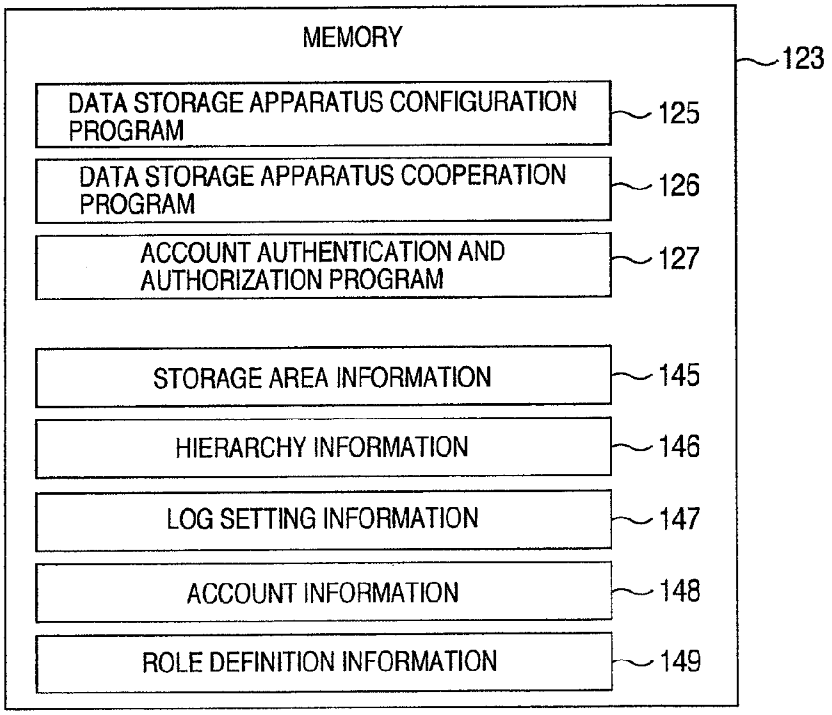
FIG. 3B is a diagram showing an example of the program and the data held in a memory 123 of a data storage apparatus 101 according to the first embodiment.

FIG. 3A shows the program and data stored in the memory 223 of the data storage apparatus 201, and FIG. 3B the program and data stored in the memory 123 of the data storage apparatus 101. The memory 223 of the data storage apparatus 201 has stored therein a data storage apparatus configuration program 225, a data storage apparatus cooperation program 226, an account authentication and authorization program 227, storage area information 245, hierarchy information 246, log setting information 247, account information 248 and role definition information 249.

The data storage apparatus configuration program 225 is for the management of the configuration of the data storage apparatuses including the creation or deletion of the storage area and the setting of the hierarchy information, the account information, the role definition information and the log setting information of the data storage apparatuses. The data storage apparatus cooperation program 226 is for the cooperation with other data storage apparatuses in hierarchical relation including the notification of the hierarchy information to the lower data storage apparatus 101 and the issue of an approval request, described later, to a data storage apparatus, if any, higher in level than the data storage apparatus 201, though not shown. The account authentication and authorization program 227 is for determining whether the manager is authorized to operate the data storage apparatus or not.

The memory 123 of the data storage apparatus 101 has stored therein a data storage apparatus configuration program 125, a data storage apparatus cooperation program 126, an account authentication and authorization program 127, storage area information 145, hierarchy information 146, log setting information 147, account information 148 and role definition information 149. The detail of each program stored in the memory 123 of the data storage apparatus 101 is similar to that of the data storage apparatus configuration program 225, the data storage apparatus cooperation program 226 and the account authentication and authorization program 227.

Figure 4A:
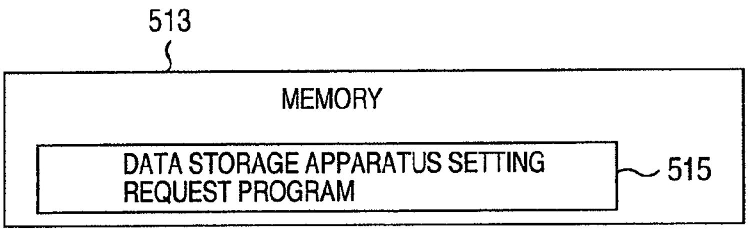
FIG. 4A is a diagram showing an example of the program held in a memory 513 of a management computer 501 according to the first and second embodiments.
Figure 4B:
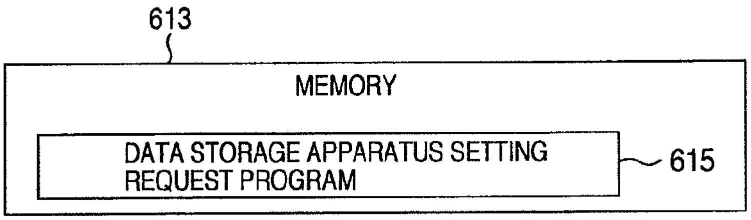
FIG. 4B is a diagram showing an example of the program held in a memory 613 of a management computer 601 according to the first and second embodiments.

FIG. 4 shows the data and the programs held in the memories 513, 613 of the management computers 501, 601.

The memory 513 of the management computer 501 has stored therein a data storage apparatus setting request program 515 for acquiring the data storage apparatus configuration information for and issuing a setting request to the data storage apparatus 201.

The memory 613 of the management computer 601 has stored therein a data storage apparatus setting request program 615 for acquiring the data storage apparatus configuration information for and issuing a setting request to the data storage apparatus 201.

The programs held in the memories 223, 123 of the data storage apparatuses 101, 201 are recorded in a nonvolatile recording medium such as a magnetic disk device of the data storage apparatuses, and at the time of actuation of the data storage apparatus, executed by being loaded to the memories 223, 123. The medium for recording the program may be other than the magnetic disk device, such as the nonvolatile memory, the CD-ROM or the floppy (registered trade mark) disk. Further, the program can be executed by being loaded to the data storage apparatus from the particular recording medium or loaded by accessing the particular recording medium through a network.

The various programs held in the memory 513 of the management computer 501 are recorded in a nonvolatile recording medium such as a magnetic disk device of the management computer 501, and at the time of actuation of the management computer 501, executed by being loaded to the memory 513. The program may be recorded in a medium other than the magnetic disk device, such as the CD-ROM or the floppy disk. Further, the program can be executed by being loaded to the management computer from the particular recording medium or loaded by accessing the particular data storage apparatus through the network.

According to this embodiment, the management computer includes the data storage apparatus setting request program. As an alternative, a configuration can be employed in which the program is arranged in the data storage apparatus with the related information so that the program in the data storage apparatus is executed by being accessed through a network from the management computer.

Next, the data held in the data storage apparatuses 201, 101 and the management computers 501, 601 are explained.

<Identifier Format Information>

According to this embodiment, in order to specify and manage the data storage apparatuses 201, 101 and the storage areas 211, 212, 111, 112, 113 supplied by the data storage apparatuses, an identifier is assigned to each data storage apparatus. This identifier is assigned in accordance with a specified format. The identifier format information 650 is the data indicating the format of the identifier assigned, i.e. the meaning of each component element of the identifier.

Figure 5:
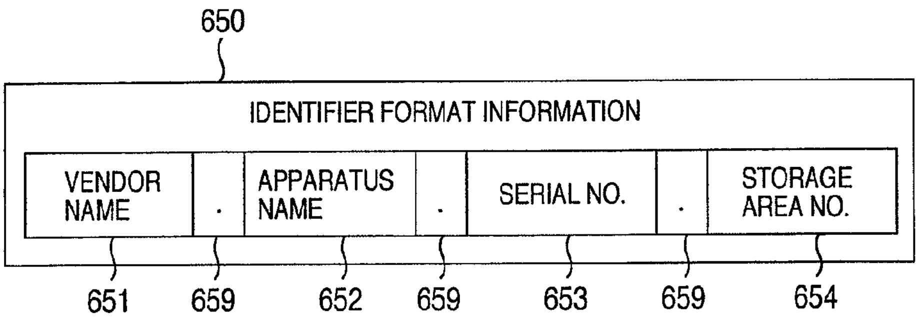
FIG. 5 is a diagram showing an example of the identifier format information 650 used in the first and second embodiments.

FIG. 5 shows an example of the identifier format information 650 used in this embodiment.

As shown in FIG. 5, in the computer system according to this embodiment, the identifier format information 650 is assumed to use a specified character string. Specifically, the character string is defined by a defining code 659 (dot "•") and includes a vendor name 651, an apparatus name 652, a serial number 653 and a storage area number 654 arranged in that order. The data storage apparatuses 201, 101 are specified by the vendor name 651, the apparatus name 652 and the serial number 653.

According to this embodiment, the data storage apparatus 201 is assigned the vendor name "ABC", the apparatus name "XX200" and the serial number "0123". Also, the data storage apparatus 101 is assigned a vendor name "DEF", an apparatus name "YY100" and a serial number "0456". Further, the data storage apparatus 102 is assigned a vendor name "GHI", an apparatus name "ZZ100" and a serial number "0789".

Also, according to this embodiment, the number assigned to each storage area as in FIG. 2, for example, is used as the storage area number 654. In this case, the storage area 221 of the data storage apparatus 201 is expressed by a character string "ABC. XX200. 0123. 211".

According to this embodiment, this identifier format information 650 is held in the data storage apparatuses 101 201, and in accordance with the data storage apparatus cooperation programs 126, 226, the identifiers acquired from the data storage apparatuses 201, 101 are analyzed thereby to specify the data storage apparatus and the storage area.

In the computer system according to this embodiment, the very information for identifying each storage area assigned in advance can also be used as an identifier format. In the case where the identifier format is not unique, i.e. in the case where the configuration is different from one identifier to another, however, the storage area information acquired from each data storage apparatus cannot be matched with the hierarchy information. In the case where the format of the information assigned in advance fails to satisfy the aforementioned conditions, therefore, the data storage apparatuses 101, 201 are required to be equipped with a format conversion program by which the information for identifying the storage area acquired from the data storage apparatuses 101, 201 is converted to a format matched with the hierarchy information according to this embodiment.

<Storage Area Information>

The storage area information 245, 145 held by the data storage apparatuses 101, 201 as information on the storage areas 211, 212, 111, 112, 113 supplied to the computer, etc. are explained. According to this embodiment, the data storage apparatus 201 has storage area information 245, and the data storage apparatus 101 storage area information 145.

FIG. 6A is a diagram showing an example of the storage area information 245 and FIG. 6B an example of the storage area information 145 according to this embodiment.

As shown in FIG. 6A, the storage area information 245 includes the storage area number 245*a* of the data storage apparatus 201, the management interface identification number 245*b* of the data storage apparatus 201, the identifier 245*c* for specifying each storage area, and the capacity 245*d* thereof. Similarly, the storage area information 145 includes the respective items of the storage area number 145*a*, the identification number 145*b* and the identifier 145*c*.

The identifiers 245*c*, 145*c* for specifying the storage areas are configured and assigned in accordance with the format explained above with reference to the identifier format information 650.

<Hierarchy Information>

Next, the hierarchy information 146, 246 are explained. According to this embodiment, each data storage apparatus connected to this computer system has hierarchy information. For example, the upper data storage apparatus 201 having a lower storage area as another storage area and the lower data storage apparatus 101 of which the storage area is used by the upper data storage apparatus have hierarchy information 146, 246, respectively. This hierarchy information include information on the existence of the lower storage area, information for specifying the lower storage area, if any, a storage area control level for limiting the operation executable by the manager in the lower storage area, a data storing method, the existence of the upper data storage apparatus using the particular storage area and the information for specifying the upper data storage apparatus, if any.

FIG. 7A shows an example of the hierarchy information 246 according to this embodiment, and FIG. 7B an example of the hierarchy information 146 according to this embodiment. This embodiment is explained below with reference to the hierarchy information 246 held in the memory 223 of the data storage apparatus 201.

As shown in FIGS. 7A, 7B, the hierarchy information 246 include a total storage area number 246*a*, 146*a*, an identifier 246*b*, 146*b* for specifying a data storage apparatus, a storage area control level 246*c*, 146*c* for limiting the operation executable by the manager in the storage area of the lower data storage apparatus, a lower storage area existence flag 246*d*, 146*d* indicating whether a hierarchically lower storage area exists or not, an identifier 246*e*, 146*e* for specifying a lower storage area, an upper storage area existence flag 246*f*, 146*f* indicating whether an upper storage area exists or not and an upper storage area identifier 246*g*, 146*g* for specifying the upper storage area, respectively.

The identifiers 246*b*, 246*e*, 246*g* are configured in accordance with the format explained above with reference to the identifier format information 650.

The storage area control level 246*c* is an identifier corresponding to the data protection level to control the operation performed by the lower role of the lower data storage apparatus on the particular storage area. The lower role, as described later, is defined as a role for managing the storage area in the lower data storage apparatus. Also, the operation of update type is defined as an operation to change the existing setting such as by creating a new storage area or deleting the storage area, while the operation of reference type is an operation for only accessing the existing setting.

As shown in FIG. 7A, with regard to the storage area with the storage area control level thereof set to "1", the lower role is authorized to execute the operation of both update and reference types, while with regard to the storage area with the storage area control level set to "2", on the other hand, it is authorized to execute the operation of reference type and to execute the operation of update type with the approval of the upper data storage apparatus. With regard to the storage area with the storage level control level set to "3", on the other hand, the lower role is authorized only to perform the operation of reference type, while with regard to the storage area with the storage area control level set to "4", it is authorized to execute the operation of neither update nor reference type.

The storage area control level is set to "1", for example, in the case where the storage area in the lower data storage apparatus is covered by the upper data storage apparatus and the data are stored in both the storage area of the upper data storage apparatus and the storage area of the lower data storage apparatus. The storage area control level is set to "2", on the other hand, in the case where the storage area of the lower data storage apparatus is covered by the upper data storage apparatus and the data stored in the storage area of the lower data storage apparatus is virtualized and provided in the storage area of the upper data storage apparatus.

The storage area control level "3" is set, for example, in the case where the data stored in the storage area of the lower data storage apparatus is held as what is called WORM (write once read many) in which the data, once written, cannot be deleted or altered. The storage area control level is set to "4" in the case where the data is stored in a storage area in such a form that even the manager having a lower role cannot access or update the data in the storage area for a predetermined length of period.

According to this embodiment, the lower storage area existence flag 246*d* can assume any of three values "0", "1", "2". "0" indicates the inexistence of the lower storage area, "1" the existence of the lower storage area with the upper and lower storage areas holding the data synchronized with each other, and "2" the existence of the lower storage area with the actual data stored therein. The upper storage area existence flag 246*f*, on the other hand, can assume two values of "0" and "1" according to this embodiment, where "0" indicates the inexistence of the upper data storage apparatus and "1" the existence thereof.

Specifically, the hierarchy information 246 shown in FIG. 7A can be interpreted as follows:

The storage area "ABC. XX200. 0123. 211", of which the lower storage area existence flag 246*d* is "0", has no lower storage area. Also, since the upper storage area existence flag 246*f* is "0", it has no upper storage area.

The storage area "ABC. XX200. 0123. 212", of which the lower storage area existence flag 246*d* is "1", has the lower storage area defined by the identifier 246*d* as "DEF. YY100. 0456. 111". The storage area 212 is synchronized with the storage area 111 of the lower data storage apparatus 100, and the storage area control level 246*c* is set to "1" to permit the manager having the lower role to execute the operation of update type for the storage area 111. Also, since the upper storage area existence flag 246*f* is "0", the storage area "ABC. XX200. 0123. 211" has no upper storage area.

The storage area "ABC. XX200. 0123. 213", of which the lower storage area existence flag **246*d* is "2", has the lower storage area "DEF. YY100. 0456. 112". The storage area 213 actually holds no data and the data is stored in the storage area 112. Therefore, the storage area control level 246*c* is set to "2" so that the manager having the lower role is required to acquire the approval for executing the operation of update type for the storage area 112. The data storage apparatus 201 holds no data in the storage area 213, and upon receipt of the write instruction and the write data for the storage area 213 from the computer 303, transmits the received write data to the data storage apparatus 101 and requests the data storage apparatus 101 to write the data into the storage area 112**.

After that, the data storage apparatus 101 stores the data in the storage area 112. Also, the data storage apparatus 201, upon receipt of the request to read the storage area 213 from the computer 303, reads and acquires the data from the storage area 112 holding the particular data, and transmits it to the computer 303. The storage area "ABC. XX200. 0123. 213", of which the upper storage area existence flag is "0", has no upper storage area.

Specifically, the storage area 213 is indicated by dashed line as what may be called an imaginary area in FIGS. 1 and 2. To the computer 303, the storage area 112 formed in the data storage apparatus 101 appears to be a storage area formed in the data storage apparatus 201 (this function is called "virtualization").

<Log Setting Information>

Next, the log setting information 147, 247 are explained. The log setting information 247, 147 are for setting the type and the destination of the log output from the data storage apparatuses 201, 102. In this embodiment, the log setting information 147 held in the memory 123 of the data storage apparatus 101 is explained as an example.

Figures 8, 9:
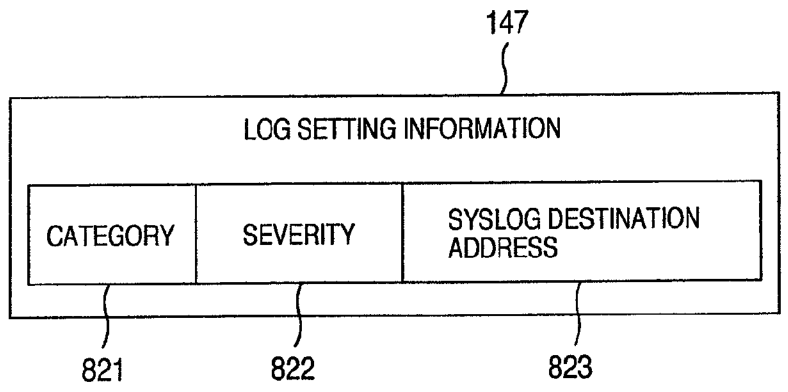
FIG. 8 is a diagram showing an example of the log setting information according to the first and second embodiments.
FIG. 9 is a diagram showing an example of the account information according to the first and second embodiments.
Figure 11:
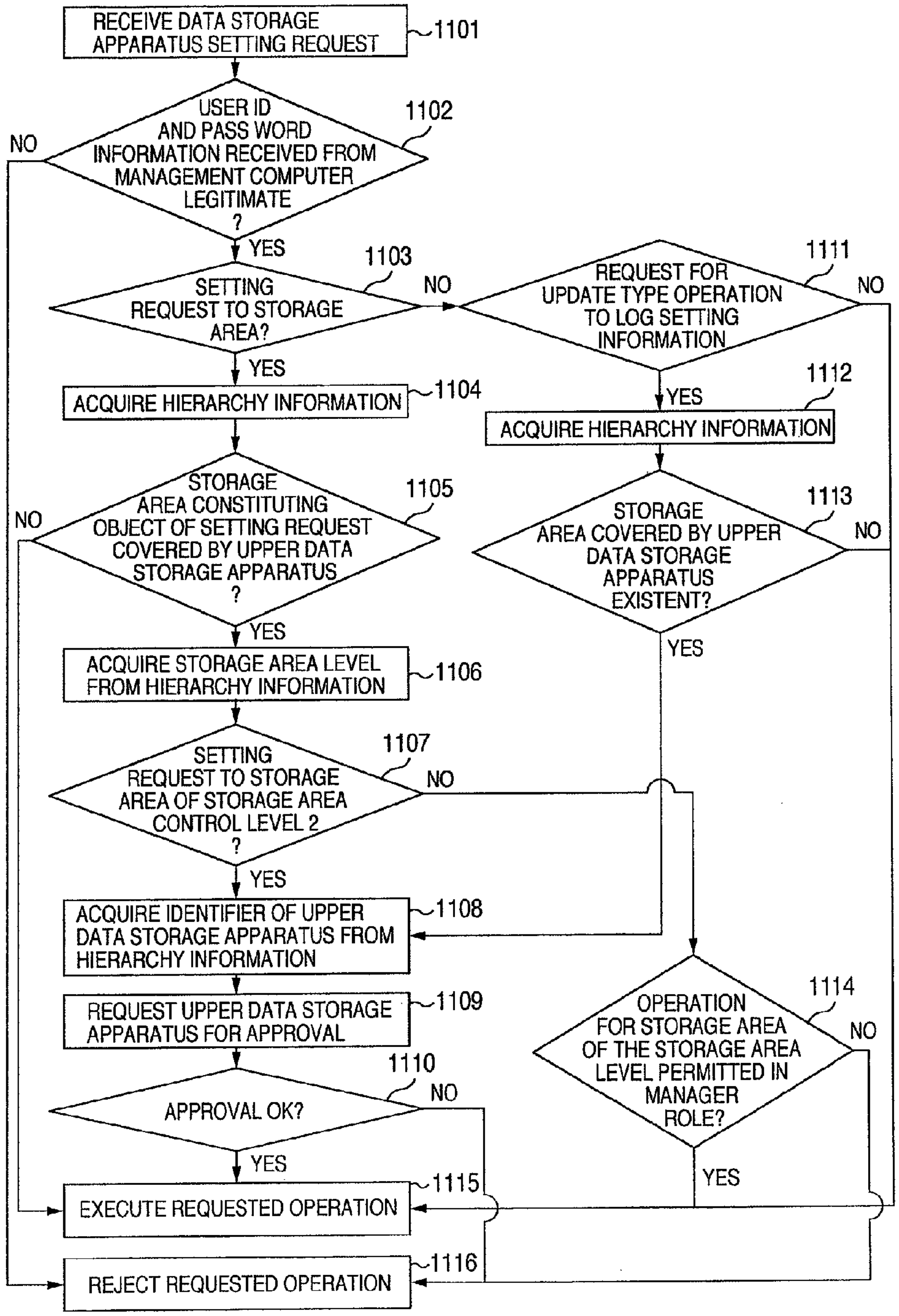
FIG. 11 is a flowchart showing an example of the process for determining a control request from a management computer of the data storage apparatuses according to the first embodiment.

FIG. 8 shows an example of the log setting information according to this embodiment. As shown in FIG. 8, the log setting information includes a category 821 indicating the type of the log output from the data storage apparatus, a severity 822 indicating the degree of importance of the log output from the data storage apparatus, and a syslog destination address 823 for outputting the log from the data storage apparatus to a syslog server. For example, only a log related to security can be output by setting a category, or only a log high in emergency degree such as the one for notifying a trouble can be output by setting the severity.

<Account Information>

Next, the account information 148, 248 are explained.

The account information 148, 248 have stored therein the information including the user ID of the manager, the password and the role. According to this embodiment, the account information 148 held in the memory 123 of the data storage apparatus 101 is explained as an example.

FIG. 9 shows an example of the account information 148 according to this embodiment. As shown in FIG. 9, the account information include a user ID 901 and a password 902 used by the manager for giving a setting request to the data storage apparatus and a role 903 indicating the operation executable by the manager in the data storage apparatus. The account information 148 may take the form of a plurality of roles 903 for one user ID 901. The role 903 is explained in detail later with reference to FIG. 10.

Although this embodiment uses the user ID and the password as the account information to identify the manager, a session ID or the like may also be used.

<Role Definition Information>

The role definition information 149, 249 define the operation executable by the manager in the data storage apparatus. According to this embodiment, the role definition information 149 held in the memory 123 of the data storage apparatus 101 is explained as an example.

FIG. 10 shows an example of the role definition information 149 according to this embodiment. As shown in FIG. 10, the role definition information identifying an operation executable by each role includes a role name 1001, an operation 1002 for the storage area covered by the upper data storage apparatus, an operation 1003 for the storage area not covered by the upper storage apparatus, an operation 1004 for the log setting information and an operation 1005 for the account information. These operations include the operations **1002*a*, 1003*a*, 1004*a*, 1005*a* of update type and the operations 1002*b*, 1003*b*, 1004*b*, 1005*b* of reference type. Other operations include an approval operation 1006** for determining the approval or disapproval of the approval request from the lower data storage apparatus.

The upper role is for managing the lower storage area covered by the upper data storage apparatus. The manager having the upper role can execute the operation of update and reference types for the lower storage area in the lower data storage apparatus covered by the upper data storage apparatus, but cannot execute the operation of update or reference type for the other storage areas in the lower data storage apparatus and the log setting information.

The lower role is for managing the storage area located in the lower data storage apparatus but not covered by the upper data storage apparatus. The manager having the lower role can execute the operation of update and reference types for the storage area not covered by the lower data storage apparatus. With regard to the operation of update and reference types for the storage area covered by the upper data storage apparatus, however, the manager having the lower role is authorized to execute the operation corresponding to the storage area control level as described above. As for the log setting information, the manager having the lower role, though permitted to execute the operation of reference type, is required to acquire the approval of the manager having the approval role for the operation of update type.

The account management role sets the account information such as the user ID of the manager. The manager having the account management role is not permitted to perform the operation of update and reference types for the storage area but authorized to execute the operation of update and reference types for the account information.

The audit role is for auditing to determine whether the account information and the log setting information are correctly set or not. The manager having the audit role is authorized to execute the operation of reference type for the storage area, the operation of reference type for the log setting information and the operation of reference type for the account information.

The approval role is for giving an approval to an approval request from the lower data storage apparatus. The manager having the approval role is authorized to give the approval to the lower data storage apparatus to perform the operation of update type for the storage area covered by the upper data storage apparatus or the operation of update type for the log setting information. In the case where a trouble occurs in the data stored in the storage area of the lower data storage apparatus covered by the upper data storage apparatus, for example, the manager having the upper role would originally perform the trouble-shooting operation (operation of update type). Nevertheless, the manager having the lower role, in order to perform the trouble-shooting operation provisionally on behalf of the manager having the upper role, transmits an approval request to the manager having the approval role and upon acquisition of the approval, can perform the troubleshooting operation. The manager having the approval role may receive the contents of the approval request together with the approval request. Also, the contents of the approval request may be confirmed by other means such as telephone or mail.

In FIG. 9, assume that the upper role is registered for the user ID of a given manager and, though not expressly shown in FIG. 9, the approval role is registered in the upper data storage apparatus. This manager, upon receipt of an approval request from the lower data storage apparatus, can access the lower storage area in the lower data storage apparatus covered by the upper data storage apparatus by means of the upper role and give the approval to the lower data storage apparatus by means of the approval role.

Also, in the case where the storage area of the upper data storage apparatus hierarchically related to the storage area of the lower data storage apparatus is converted by a still upper data storage apparatus, for example, a given manager may have the approval role, the upper role and the lower role for the lower data storage apparatus.

<Process to Determine Execution of Control Request to Data Storage Apparatus>

Next, the process executed by the data storage apparatus 101 upon receipt of the setting request from the management computer to the data storage apparatus in the computer system according to this embodiment is explained.

[Step 1101]

The CPU 121 of the data storage apparatus executes the account authentication and authorization program 127 and, through the management interface 120, receives the setting request from the management computer 601 connected to the management network 410. The information transmitted from the management computer 601 contains the information on the user ID, the password, the setting operation and the object of the setting operation.

[Step 1102]

The CPU 121, upon receipt of the setting request from the management computer 601, determines whether the user ID and the password transmitted thereto are correct or not based on the account information of FIG. 9 in accordance with the account authentication and authorization program 127, and upon determination that they are correct, the process proceeds to step 1103. Otherwise, the process proceeds to step 1116.

[Step 1103]

The CPU 121 determines whether the object of the setting operation requested by the management computer 601 is a storage area or not in accordance with the account authentication and authorization program 127. Upon determination that the object of the setting operation is the setting request for the storage area, the process proceeds to step 1104. Otherwise, the process proceeds to step 1111.

In the case where the setting request from the management computer concerns an operation for the storage area such as the deletion of the existing storage area or the creation of a new storage area, for example, the process proceeds to step 1104. Otherwise, or in the case of an operation for other than the storage area such as the change in the password, for example, the process proceeds to step 1111.

[Step 1104]

The CPU 121 executes the data storage apparatus configuration program 125 in accordance with the account authentication and authorization program 127, and acquires by accessing the hierarchy information 146 of the storage area constituting the object of the setting operation requested by the management computer 601.

[Step 1105]

The CPU 121 determines, in accordance with the account authentication and authorization program 127, whether the storage area constituting the object of the setting operation requested by the management computer 601 is covered by the upper data storage apparatus. Specifically, the CPU 121 accesses the upper data storage area existence flag **146*f* of the hierarchy information 146. In the case where the storage area is covered by the upper data storage apparatus, the process proceeds to step 1106, otherwise, to step 1114**.

[Step 1106]

The CPU 121, in accordance with the account authentication and authorization program 127, acquires the storage area control level **146*c* for the storage area constituting the object of the setting operation requested by the management computer 601 based on the hierarchy information 146 acquired in step 1104**.

In the case of a setting request for the storage area 111, for example, the storage area level is "1" as understood from FIG. 7B.

[Step 1107]

The CPU 121, in accordance with the account authentication and authorization program 127, determines whether the setting operation requested by the management computer 501 is the operation for the storage area with the storage area level of "2", and upon determination that the setting operation is for the storage area of the storage area level "2", the process proceeds to step 1108. Otherwise, the process proceeds to step 1114.

[Step 1108]

The CPU 121, in accordance with the account authentication and authorization program 127, accesses the upper storage area identifier **146*g* of the hierarchy information 146 acquired in step 1110 and acquires the data storage apparatus identifier for identifying the upper data storage apparatus higher than the data storage apparatus 101**.

[Step 1109]

The CPU 121, in accordance with the account authentication and authorization program 127, gives an approval request to the upper data storage apparatus having the data storage apparatus identifier acquired in step 1108, asking whether the setting operation requested by the management computer 601 can be executed or not.

In the case of the data storage apparatus 101, for example, the CPU 121 sends an approval request to the upper data storage apparatus 201 requesting the approval to execute the setting operation requested by the management computer 601.

The upper data storage apparatus having received the approval request in step 1109 gives an inquiry to the management computer (not expressly shown) used by the manager having the approval role in the account information of the particular data storage apparatus, and returns the result thereof to the lower data storage apparatus.

[Step 1110]

In the case where the CPU 121 acquires the approval from the upper data storage apparatus to the approval request in step 1109 in accordance with the account authentication and authorization program 127, the process proceeds to step 1115. Otherwise, the process proceeds to step 1116.

[Step 1111]

The CPU 121, in accordance with the account authentication and authorization program 127, determines whether the setting operation requested by the management computer 601 is the operation of update type for the log information or not. In the case where the setting operation is the one of the update operation for the log information, the process proceeds to step 1112. Otherwise, the process proceeds to step 1115.

In the case where the setting operation requested by the management computer is the operation of update type for the log information such as to change the type of the log (Refer to FIG. 8) output from the data storage apparatus, for example, the process proceeds to step 1112.

[Step 1112]

The CPU 121, in accordance with the account authentication and authorization program 127, executes the data storage apparatus configuration program 125 and acquires the hierarchy information 146 of the data storage apparatus 101.

[Step 1113]

The CPU 121, in accordance with the account authentication and authorization program 127, determines whether the data storage apparatus 101 has the storage area covered by the upper data storage apparatus based on the hierarchy information 146 acquired in step 1110. Specifically, the upper data storage area existence flag **146*f* of the hierarchy information 146 is accessed. In the case where the storage area covered by the upper data storage apparatus is so existent, the process proceeds to step 1108. Otherwise, the process proceeds to step 1115**.

The data storage apparatus 101 has the storage area covered by the upper data storage apparatus, for example, and therefore the process proceeds to step 1108. According to this embodiment, the data storage apparatus 101 is taken as an example. In the case where the request is addressed to the data storage apparatus 201, on the other hand, the process proceeds to step 1115 due to the fact that the particular data storage apparatus has no storage area covered by the upper data storage apparatus.

[Step 1114]

The CPU 121 executes the data storage apparatus configuration program 125 and determines whether the manager given the setting request from the management computer 601 is authorized to execute the particular operation or not, based on the account information 148 shown in FIG. 9, the hierarchy information 146 of the data storage area acquired in step 1104 and the the role definition information 149 of the manager shown in FIG. 10, and upon determination that the manager is so authorized, the particular operation is executed (step 1115), while in the case where the manager is not so authorized, the execution of the particular operation is rejected (step 1116).

In the case where the object of operation requested by the management computer is the storage area 111, for example, as shown in FIG. 7B, the particular storage area is covered by the upper data storage apparatus and the storage area control level **146*c* is “1”. In this case, the account information 148 is accessed, and in the case where the role of the manager registered in the account information 148 is the upper or lower role, the manager is authorized to execute the operation of reference and update types for the particular storage area, and the process proceeds to step 1115**.

In the case where the storage area level of the storage area constituting the object of operation requested by the management computer is “3”, on the other hand, the manager is authorized to execute the operation of reference and update types as long as the manager registered in the account information 148 has the upper role. Therefore, the process proceeds to step 1115. In the case where the storage area level is “3” and the role of the manager registered in the account information 148 is the lower role, however, the manager, though authorized to execute the operation of reference type for the storage area, is not authorized to execute the operation of update type. Therefore, the process proceeds to step 1116.

[Step 1115]

The CPU 121, in accordance with the account authentication and authorization program 127, executes the data storage apparatus configuration program and performs the setting operation requested by the management computer.

[Step 1116]

The CPU 121, in accordance with the account authentication and authorization program 127, rejects to execute the setting operation requested by the management computer.

According to this embodiment, the setting request from the management computer for the data storage apparatus is processed in the manner described above.

In step 1103, the CPU 121, based on the user ID and the password information transmitted thereto, may specify the role corresponding to the user ID, after which the GUI screen corresponding to the particular role is displayed thereby to prevent the execution of illegal operation by the manager.

In the case where the answer in step 1105 is NO, the answer in step 1110 is YES, the answer in step 1111 is NO and the answer in step 1113 is NO, then the CPU 121 accesses the account information 148 in step 1105, and after confirming whether the user has a legitimate role or not, may execute the control request.

<Process of Changing Hierarchical Relation>

Next, the process for updating the hierarchy information 149 is explained.

Figure 12:
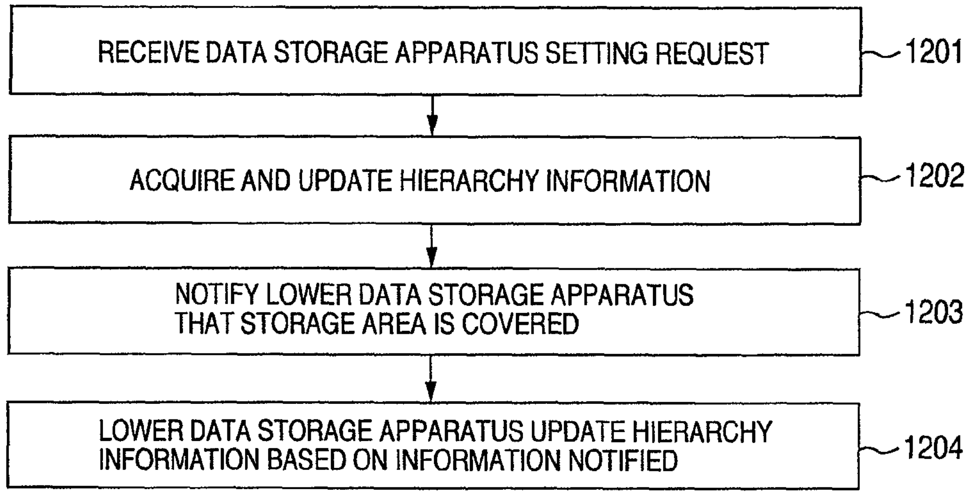
FIG. 12 is a flowchart showing an example of the process for updating the hierarchy information between the data storage apparatuses according to the first embodiment.

With reference to the flowchart of FIG. 12, the process of the data storage apparatuses 101, 201 for covering the storage area of the lower data storage apparatus by a data storage apparatus or canceling the hierarchy relation is explained.

The process executed by the data storage apparatuses 201, 101 to cover the storage area of the data storage apparatus 101 by the data storage apparatus 201 or cancel the hierarchy relation is explained. In this explanation, the authentication and authorization by the manager in <process in data storage apparatus> described above is omitted, and the manager is assumed to be authorized to execute the operation for the data storage apparatus. Also, according to this invention, an example in which the storage area of the lower data storage apparatus is covered is explained. Nevertheless, the process of canceling the hierarchical relation is similar to the process explained above.

[Step 1201]

The CPU 221 of the data storage apparatus 201 executes the account authentication and authorization program 227, and through the management interface 220, receives the setting request from the management computer 501 connected to the management network 410. The information transmitted from the management computer 501 contains the user ID, the password, the information on the operation of setting the storage area of the lower data storage apparatus in the lower storage area, the information for identifying the storage area constituting the object of operation and the information on the storage area level described later.

[Step 1202]

The CPU 221 of the data storage apparatus, in accordance with the account authentication and authorization program 227, executes the data storage apparatus configuration program 225, acquires the hierarchy information 246 of the data storage apparatus 201 and updates the particular hierarchy information based on the setting request information acquired from the management computer 501.

In the case where a request to cover the storage area 111 of the data storage apparatus 101 by the storage area 212 of the data storage apparatus 201 is received from the management computer 501, for example, the storage area control level **246*c*, the lower storage area existence flag 246*d* and the identifier 246***e* of the storage area of the lower data storage apparatus shown in FIG. 7A are set accordingly.

[Step 1203]

The CPU 221 of the data storage apparatus, in accordance with the account authentication and authorization program 227, executes the data storage apparatus cooperation program 226 and notifies the lower data storage apparatus that the storage area of particular lower data storage apparatus is covered by the upper data storage apparatus. The information thus notified contains an identifier 246*b* of the storage area of the upper data storage apparatus corresponding to the storage area covered, a storage area control level 246*c* of the storage area and an identifier 246*e* of the lower data storage area covered.

In the case where the storage area 111 is covered by the storage area 212, for example, the information including the storage area identifier "ABC. XX200. 0123. 212", the storage area level "1" and the lower storage area identifier "DEF. YY100. 0456. 111" are sent to the lower data storage apparatus.

[Step 1204]

The CPU 121 of the lower data storage apparatus 101 notified from the upper data storage apparatus 201 executes the data storage apparatus configuration program 125 and updates the hierarchy information 146 based on the notified information.

In the case where the storage area 112 is covered, for example, the value of the storage area control level 146*c* of the storage area having the storage area identifier being "DEF. YY100. 0456. 112" in FIG. 7B is updated, and so are the information on the upper storage area existence flag 146*f* and the identifier 146*g* of the upper data storage apparatus.

According to this embodiment, the upper data storage apparatus is not authenticated in the lower data storage apparatus notified from the upper data storage apparatus. As an alternative, the upper data storage apparatus may be authenticated using the ID, the password or the ID address.

According to this embodiment, the aforementioned process makes it possible to cover the storage area of a data storage apparatus.

According to this embodiment, the aforementioned configuration can prevent the erroneous operation or illegal operation of the manager in a hierarchical configuration of the data storage apparatuses.

The embodiment is explained above with reference to a case in which the data storage apparatus setting request program corresponding to each data storage apparatus is prepared for each management computer. Nevertheless, this invention is not limited to such a configuration. For example, a single data storage apparatus setting request program may correspond to a plurality of data storage apparatuses, and in the case where the identification numbers of the management interfaces of a plurality of data storage apparatuses can be managed and the communication is possible between the management computer and each data storage apparatus, the data storage apparatus setting request program corresponding to a plurality of data storage apparatuses detected from a single management computer can be activated.

[Second Embodiment]

A second embodiment is explained below with reference to FIGS. 13 to 17.

<System Configuration>

Figure 13:
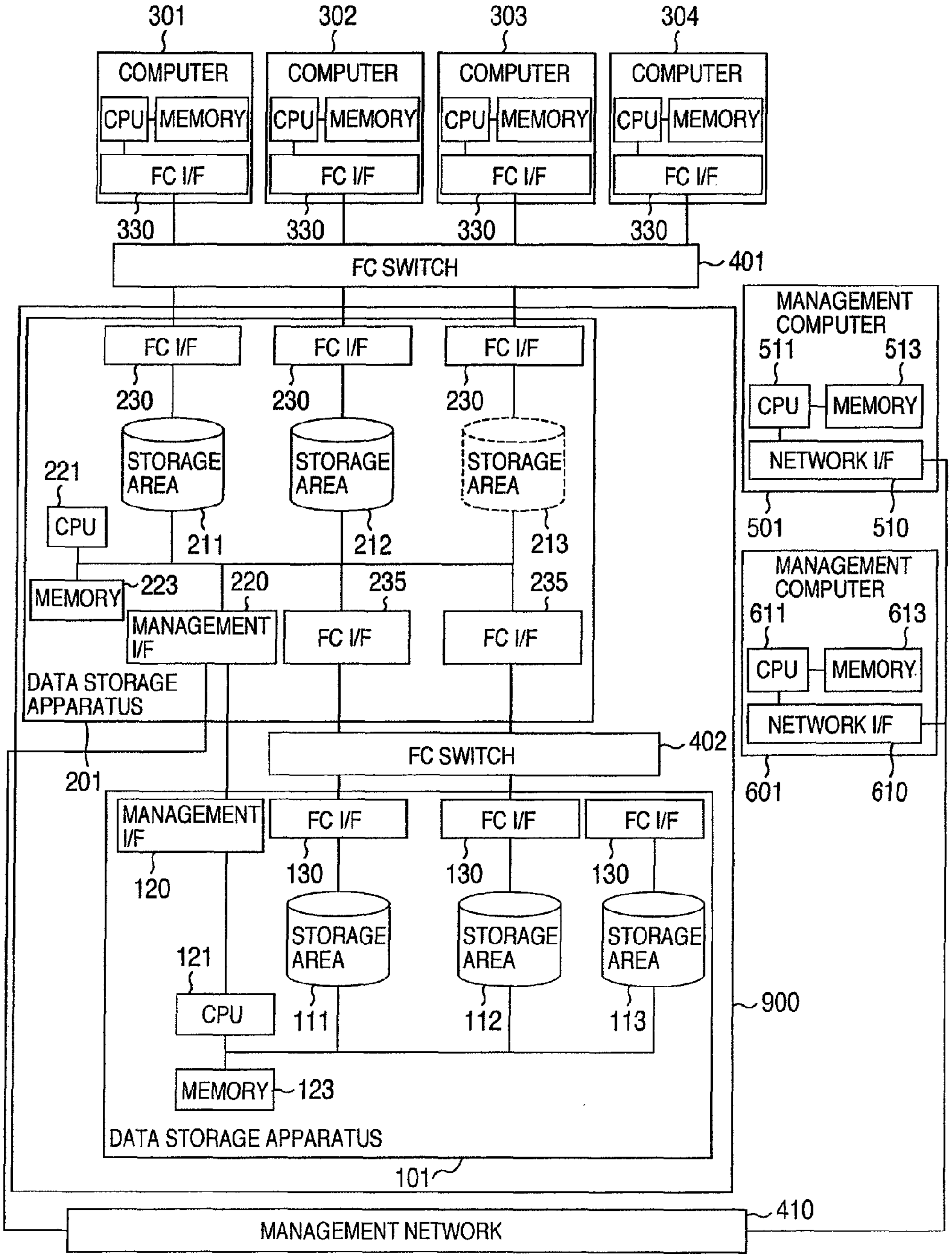
FIG. 13 is a diagram showing an example of the system configuration according to the second embodiment.

With reference to FIG. 13, the system configuration according to the second embodiment is explained. According to the second embodiment, the management computer is adapted to be connected to the data storage apparatus 101 only through the data storage apparatus 201. This is by reason of the fact that the data storage apparatus 101 has the function not to receive the access from other than the legitimate data storage apparatus registered in advance. As in the first embodiment, the management computer 501 manages the data storage apparatus 201, and the management computer 601 the data storage apparatus 101. Also, according to this embodiment, the lower data storage apparatus has the function not to receive the access from other than the upper data storage apparatus. As another system configuration, however, as shown in FIG. 13, the upper data storage apparatus and the lower data storage apparatus may be installed in a secure room 900 so that an external access is received only by the upper data storage apparatus. In this way, the access to the lower data storage apparatus can be made physically impossible from other than the upper data storage apparatus.

A method of managing the data storage apparatus in the computer system having the hierarchized data storage apparatuses is explained below. In the description of this embodiment, the component parts having similar functions and configuration to those of the first embodiment are designated by the same reference numerals, respectively, and not described in detail.

The computer system according to this embodiment, as compared with the computer system according to the first embodiment, is so configured that the setting request cannot be directly given to the data storage apparatus 101 from the management computer.

Figure 14A:
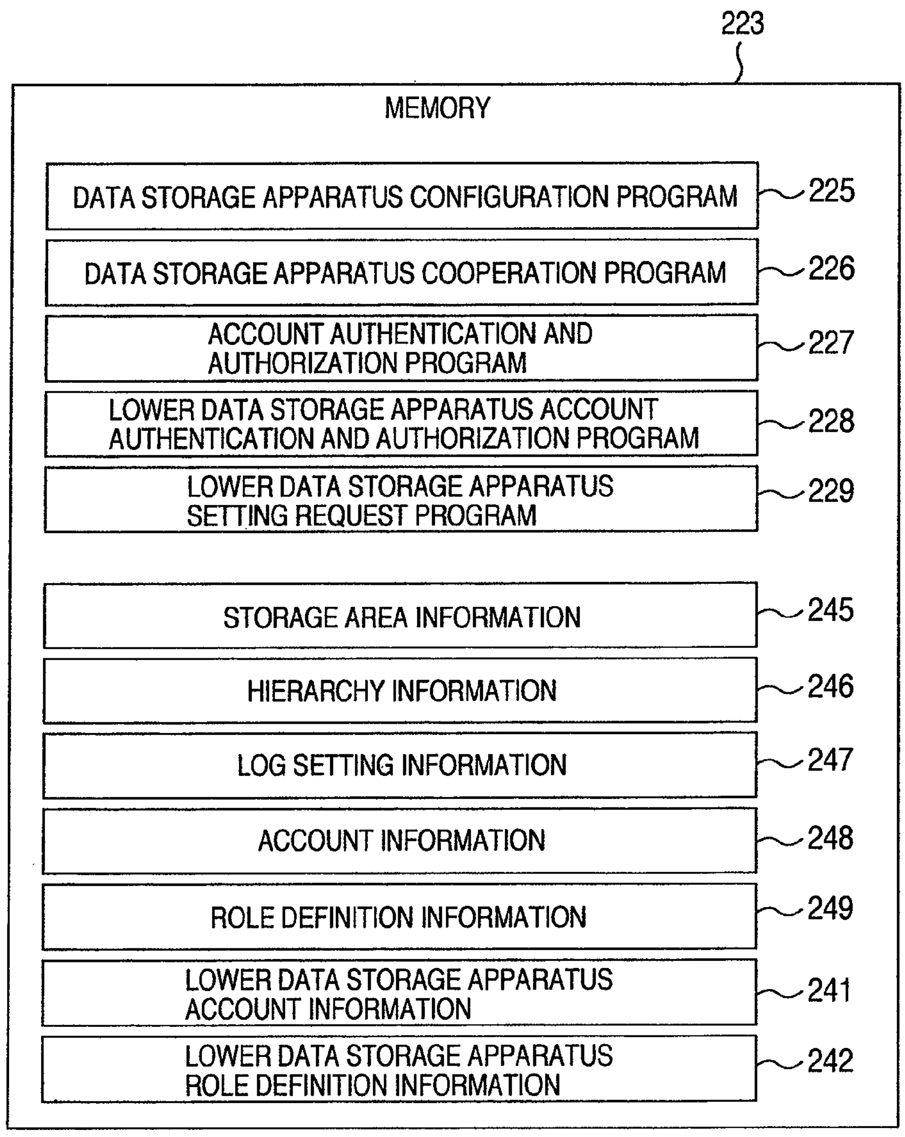
FIG. 14A is a diagram showing an example of the program and data held in the memory 223 of the data storage apparatus 201 according to the second embodiment.
Figures 14B, 15:
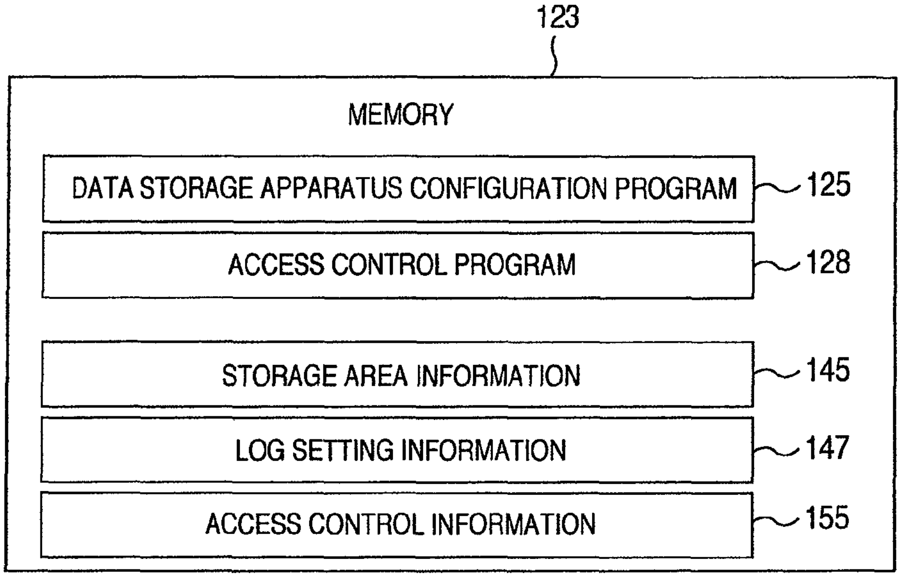
FIG. 14B is a diagram showing an example of the program and data held in the memory 123 of the data storage apparatus 101 according to the second embodiment.
FIG. 15 is a diagram showing an example of the access control information according to the second embodiment.

FIG. 14A shows the program and data held in the memory 223 of the data storage apparatus 201 according to this embodiment, and FIG. 14B the program and data held in the memory 123 of the data storage apparatus 101 according to this embodiment.

The memory 223 of the data storage apparatus 201, in addition to the data and program held according to the first embodiment, has stored therein a lower data storage apparatus account authentication and authorization program 228 for receiving the setting request to the lower data storage apparatus from the management computer and determining whether the particular request can be executed or not, a lower data storage apparatus setting request program 229 for requesting the data storage apparatus configuration program 125 of the lower data storage apparatus to execute the operation requested by the management computer, the account information 241 of the lower data storage apparatus and the role definition information 242 of the lower data storage apparatus. In the data storage apparatus 201, the account authentication and authorization program 227 responds to the setting request to the upper data storage apparatus 201, while the lower data storage apparatus account authentication and authorization program 228 responds to the setting request to the lower data storage apparatus.

Also, the memory 123 of the data storage apparatus 101 has stored therein a data storage apparatus configuration program 125, an access control program 128 for limiting the data storage apparatus and the management computer connectable to the data storage apparatus 101 as a new program, storage area information 145, log setting information 147 and access control information 155. The memory 123 has stored therein no other data and program held in the first embodiment.

<Access Control Information>

The lower data storage apparatus includes the access control information 155 for identifying the upper data storage apparatus. According to this embodiment, the access control information 155 held in the data storage apparatus 101 is explained as an example. As shown in FIG. 15, the access control information 155 is configured of an upper data storage apparatus name 1501 and an IP address 1502 of the upper data storage apparatus.

<Process of Determining Execution of Control Request to Data Storage Apparatus>

Figure 16:
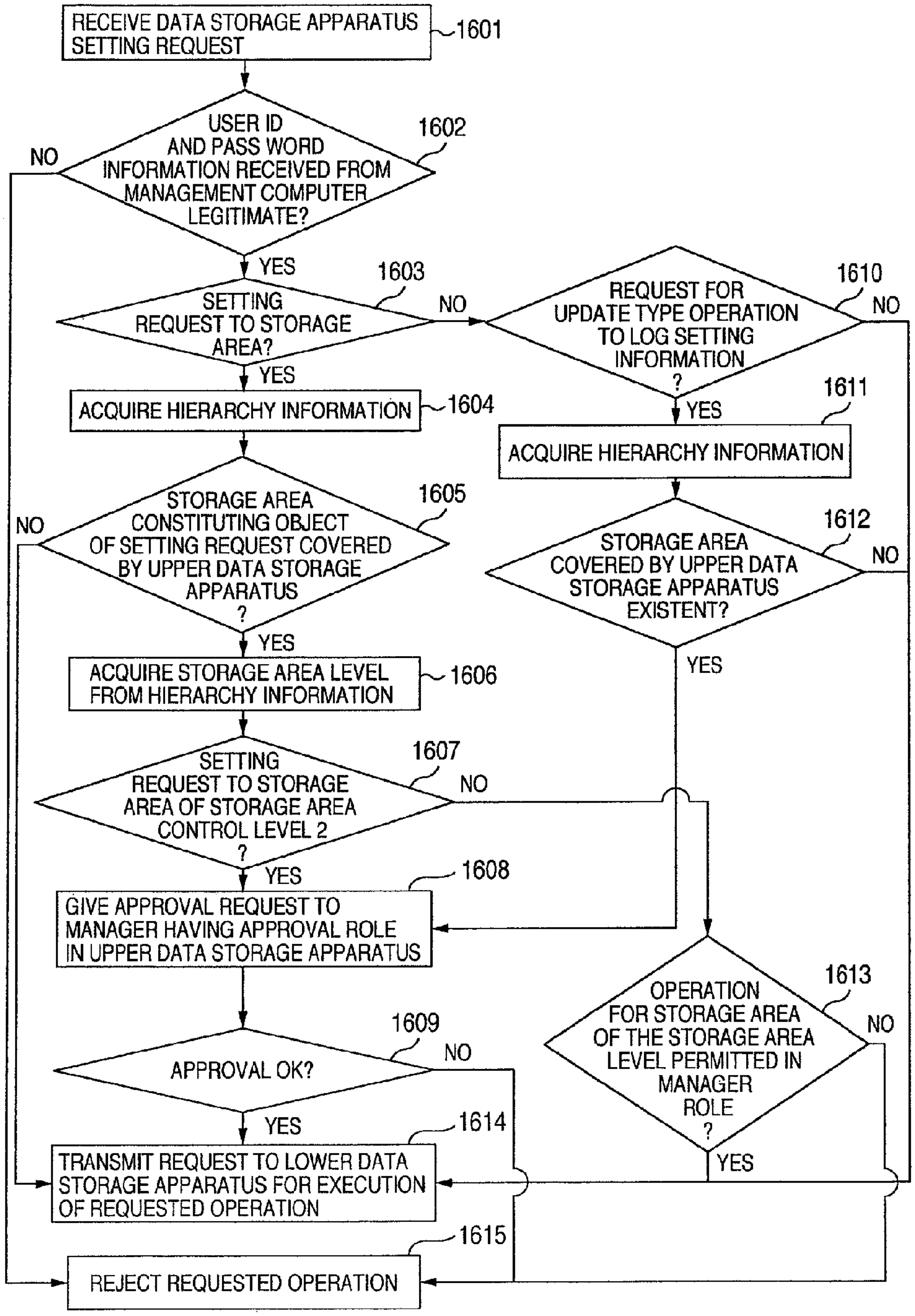
FIG. 16 is a flowchart showing an example of the process for determining a control request from a management computer of the data storage apparatuses according to the second embodiment.

Next, with reference to the flowchart of FIG. 16, the process in the data storage apparatus 201 for receiving the setting request from the management computer 501 in the computer system according to this embodiment is explained.

Unlike the first embodiment for processing the setting request to the data storage apparatus (FIG. 11), the upper data storage apparatus determines whether the setting request from the management computer 501 can be executed or not, and in the case where the execution of the requested operation is permitted, an operation execution request is sent from the upper data storage apparatus to the lower data storage apparatus. As long as the execution requester is a legitimate upper data storage apparatus, the lower data storage apparatus executes the requested operation. In this way, the manager is not authenticated and authorized in the lower data storage apparatus.

[Step 1601]

The CPU 221 of the data storage apparatus executes the account authentication and the authorization program 228 of the lower data storage apparatus and receives the setting request from the management computer like in step 1101.

[Step 1602]

The CPU 221, upon receipt of the setting request from the management computer 501, determines whether the transmitted account information is correct or not based on the lower data storage apparatus account information 241 in accordance with the account authentication and the authorization program 228 of the lower data storage apparatus, and upon determination that the account information is not correct, rejects the execution of the requested operation (step 1615).

[Step 1603]

The CPU 221, in accordance with the account authentication and the authorization program 228 of the lower data storage apparatus, determines whether the object of the setting operation requested by the management computer 501 is a storage area or not. In the case where the setting request is for the storage area, the process proceeds to step 1604. Otherwise, the process proceeds to step 1610.

[Step 1604]

The CPU 221, in accordance with the account authentication and the authorization program 228 of the lower data storage apparatus, executes the data storage apparatus configuration program, and acquires the hierarchy information 246 of the storage area constituting the object of the setting operation requested by the management computer 501.

[Step 1605]

The CPU 221, in accordance with the account authentication and the authorization program 228 of the lower data storage apparatus, determines whether the storage area constituting the object of the setting operation requested by the management computer 501 is covered by the upper data storage apparatus or not. Specifically, the lower storage area identifier 246$e$ of the hierarchy information 246 is accessed. In the case where the storage area is covered by the upper data storage apparatus, the process proceeds to step 1606. Otherwise, the process proceeds to step 1614.

[Step 1606]

The CPU 221, in accordance with the account authentication and the authorization program 228 of the lower data storage apparatus, acquires the storage area control level 246$c$ of the storage area constituting the object of the setting operation requested by the management computer 501 based on the hierarchy information 246 acquired in step 1604.

[Step 1607]

The CPU 221, in accordance with the account authentication and the authorization program 228 of the lower data storage apparatus, determines whether the setting operation requested by the management computer 501 is for the storage area of the storage area level "2" or not, and in the case of the operation for the storage area of the storage area level "2", the process proceeds to step 1608. Otherwise, the process proceeds to step 1613.

[Step 1613]

The CPU 221, in accordance with the account authentication and authorization program 228 of the lower data storage apparatus, determines whether the manager giving the setting request from the management computer 501 is authorized to execute the particular operation, based on the hierarchy information 246 of the storage area acquired in step 1604 and the role information of the manager shown in FIG. 10, and in the case where the manager is authorized to execute the operation, the process proceeds to step 1614. Otherwise, the process proceeds to step 1615.

[Step 1610]

The CPU 221, in accordance with the account authentication and the authorization program 228 of the lower data storage apparatus, determines whether the setting operation requested by the management computer 501 is of update type for the log setting information 147 or not, and in the case of the operation of update type for the log setting information 147, the process proceeds to step 1611. Otherwise, the process proceeds to step 1614.

[Step 1611]

The CPU 221, in accordance with the account authentication and the authorization program 228 of the lower data storage apparatus, executes the data storage apparatus configuration program 225 and acquires the hierarchy information 246 of the data storage apparatus.

[Step 1612]

The CPU 221, in accordance with the account authentication and the authorization program 228 of the lower data storage apparatus, determines whether the data storage apparatus having the storage area constituting the object of the setting operation requested by the management computer 501 has the storage area covered by the upper data storage apparatus, based on the hierarchy information 246 acquired in step 1611. Specifically, the lower storage area identifier 246$e$ of the hierarchy information 246 is accessed. In the case where the storage area is covered by the upper data storage apparatus, the process proceeds to step 1608. Otherwise, the process proceeds to step 1614.

[Step 1608]

The CPU 221, in accordance with the account authentication and the authorization program 228 of the lower data storage apparatus, gives an approval request to the data storage apparatus as to whether the setting operation requested by the management computer 501 can be executed or not.

In the approval request in step 1608, the data storage apparatus 201 makes an inquiry to the management computer (not expressly shown) used by the manager having the approval role in the account information, and returns the result thereof to the lower data storage apparatus.

[Step 1609]

The CPU 221, upon acquisition of the approval in the upper data storage apparatus to the approval request in step 1608 in accordance with the account authentication and the authorization program 228 of the lower data storage apparatus, proceeds to step 1614. Otherwise, the process proceeds to step 1615.

[Step 1614]

The CPU 221, in accordance with the account authentication and the authorization program 228 of the lower data storage apparatus, executes the lower data storage apparatus setting request program 229 and requests the lower data storage apparatus to execute the setting operation requested by the management computer.

The CPU 121 of the lower data storage apparatus, upon receipt of the request to execute the setting operation from the upper data storage apparatus 201 in step 1614, executes the access control program 128, and by referring to the access control information 155 shown in FIG. 15, determines whether the requesting upper data storage apparatus is a legitimate upper data storage apparatus using the IP address thereof. In the case where the requester is a legitimate upper data storage apparatus, the data storage apparatus configuration program 125 is executed to carry out the setting operation requested by the management computer. Otherwise, the execution of the setting operation requested by the management computer is rejected.

[Step 1615]

The CPU 221, in accordance with the account authentication and the authorization program 228 of the lower data storage apparatus, rejects to execute the setting operation requested by the management computer.

According to this embodiment, the setting request from the management computer to the lower data storage apparatus through the upper data storage apparatus is processed as described above.

In step 1603, for example, the CPU 221 may specify the role corresponding to the user ID transmitted thereto based on the particular user ID and the password information transmitted thereto and display the GUI screen corresponding to the particular role thereby to prevent the execution of the illegal operation by the manager.

In the case where the determination is NO in step 1605, YES in step 1609, NO in step 1610 and NO in step 1612, then the CPU 121 may access the lower data storage apparatus account information 241 in step 1614 and thus confirming whether the user has a legitimate role or not, may execute the control request.

<Process for Changing Hierarchical Relation>

Next, the process executed for the data storage apparatus 201 to cover the storage area of the lower data storage apparatus 101 is explained with reference to FIG. 12. This process executed for the data storage apparatus 201 to cover the storage area of the lower data storage apparatus 101 is different from the similar process in the first embodiment (Refer to FIG. 12) in the lack of the notification process from the upper data storage apparatus to the lower data storage apparatus after the storage area of the lower data storage apparatus is covered.

In the explanation of this embodiment, as in the first embodiment, the authentication and authorization of the manager for processing the setting request received from the management computer is omitted, and the manager is authorized to execute the operation for the data storage apparatus. Although this description refers to a case in which the storage area of the lower data storage apparatus is covered, the process for canceling the hierarchical relation is similar to the aforementioned process.

[Step 1201 in Second Embodiment]

This step is similar to step 1201 in the first embodiment.

[Step 1202 in Second Embodiment]

The CPU 221 of the data storage apparatus, in accordance with the account authentication and the authorization program 227, executes the data storage apparatus configuration program 225, acquires the hierarchy information 246 of the data storage apparatus and updates the hierarchy information based on the setting request information acquired from the management computer 501.

Upon receipt of a request from the management computer 501 to cover the storage area of the data storage apparatus 101 by the storage area of the data storage apparatus 201, for example, the CPU 221 sets the storage area control level 246*c* for the particular storage area, the lower storage area existence flag 246*d* and the identifier 246*e* of the storage area of the lower data storage apparatus as shown in FIG. 7A. The storage area control level is for controlling the operation of the lower role for the storage area of the lower data storage apparatus in the lower data storage apparatus role definition information 242 held in the upper data storage apparatus. The storage area control level is similar to the one described in detail with reference to FIG. 7A.

According to this embodiment, the storage area of one data storage apparatus can be covered by another data storage apparatus by the process described above.

As explained above, according to this embodiment, even in the case where the data storage apparatus 101 is connected to the management computers 501, 601 through the data storage apparatus 201 and the storage areas thereof have a hierarchical relation to each other, the erroneous operation and illegal operation of the manager from the management computer can be prevented.

Also, according to this embodiment, the access control program 128 of the lower data storage apparatus, upon receipt of the request to execute the setting operation from the upper data storage apparatus, determines the legitimacy thereof based on the IP address of the requester. Nevertheless, the upper data storage apparatus may be authenticated using an ID, a password or a certificate.

Although this embodiment includes the data storage apparatus setting request program in the management computer, the particular program may alternatively be included in the data storage apparatus like in the first embodiment to access the program of the particular apparatus from the management computer through a network.

Further, although this embodiment is explained above with reference to a case in which the data storage apparatus setting request program corresponding to each data storage apparatus is prepared for each management computer, the invention is not limited to this configuration. Like in the first embodiment, for example, a single data storage apparatus setting request program may correspond to a plurality of data storage apparatuses to manage the identification numbers of the management interfaces of a plurality of data storage apparatuses, and in the case where a setting request can be issued to the plurality of the data storage apparatuses from a management computer, a data storage apparatus setting request program corresponding to the plurality of the data storage apparatuses detected from a single management computer can be started.

(First Modification)

Figure 17:
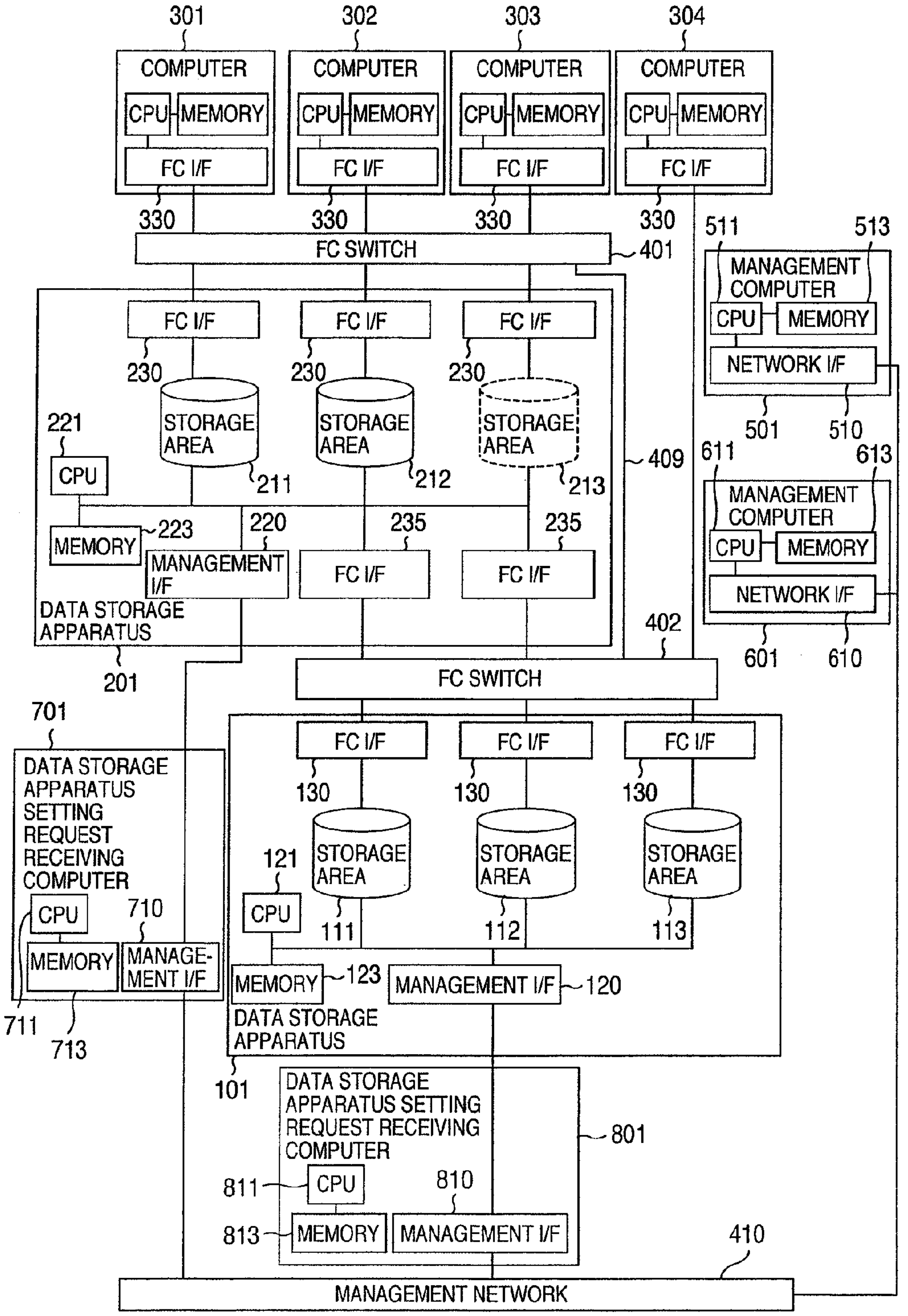
FIG. 17 is a diagram showing a modification of the system configuration according to the first and second embodiments.

In the first and second embodiments described above, the programs and the related information are all held in the memory of the data storage apparatuses. Alternatively, as shown in FIG. 17, the data storage apparatuses can be operated through an exclusive computer such as a server including the data storage apparatus setting request receiving computers 701, 801 for receiving the operation request from the manager to the data storage apparatuses. The data storage apparatus setting request receiving computers 701, 801 can be implemented as a maintenance terminal (service processor) for managing the data storage apparatuses. In this case, the memories 713, 813 have stored therein the programs and information stored in the memories 123, 223, respectively. The programs are executed by CPUs 701, 801, respectively. As an alternative, a single data storage apparatus setting receiving computer 701 (801) may be connected to the management network 410 via a management I/F 710 (810) to receive the operation request to either the data storage apparatus 101 or 201 from the manager.

Although the first and second embodiments described above represent a case in which a fiber channel network is used for connection between the computer and the data storage apparatuses and between the data storage apparatuses, the invention is not limited to this type of network. As long as proper devices are selected for the network in place of the FC switches and the FC interface, other networks is also applicable with equal effect. Also, the FC switches 401, 402 can be connected in cascade through a communication path 409.

According to the embodiments described above, the operating error and the illegal operation by the manager for the storage area of the hierarchized data storage apparatuses in a computer system.

The present invention is not limited to the embodiments described above, and can of course be embodied in various forms without departing from the scope and spirit of the invention.

What is claimed is:

1. A computer system, coupled to a computer, comprising:

a first storage system having a plurality of first storage areas for storing the data used by the computer;

a second storage system coupled to the first storage system and the computer, the second storage system including a plurality of second storage areas supplied to the computer, the second storage areas including a virtual storage area, the virtual storage area being associated with one of the first storage areas such that to the computer the associated one of the first storage areas appears to be the virtual storage area with which the first storage area is associated;

a first management computer coupled to the first storage system and controlling the first storage system and data stored in the first storage areas; and a second management computer coupled to the second storage system and controlling the second storage system and the data stored in the virtual storage area, wherein the first storage system is configured to store first hierarchy information that indicates a correspondence between the first storage areas and the second storage areas, wherein the second storage system is configured to store second hierarchy information that indicates a correspondence between the second storage areas and the first storage areas, wherein the first management computer is configured to transmit identification information of a first manager managing the first storage system and a control request for a setting operation to a given first storage area of the first storage areas to the first storage system, the setting operation being an operation to change the correspondence between a first storage area and a second storage area, wherein the first storage system is configured to receive the identification information of the first manager and the control request from the first management computer, and to determine whether the given first storage area, constituting an object of the control request, is associated with the virtual storage area based on the first hierarchy information, and when the given first storage area is determined to be associated with the virtual storage area, then the first storage system is configured to transmit an approval request to the second storage system to request approval to execute the setting operation which is the subject of the control request wherein the second storage system is configured to receive the approval request, and to transmit the approval request to the second management computer to request a second manager having an approval role to approve the execution of the setting operation, wherein the second management computer is configured to transmit to the second storage system a response to the approval request, the response indicating whether or not execution of the setting operation is approved, and wherein the first storage system is configured to receive the response from the second storage system, and if the response indicates approval of the setting operation, the first storage system is configured to execute the setting operation which is the subject of the control request, otherwise the first storage system is configured to reject the control request for the setting operation.

2. The computer system according to claim 1, wherein the second storage system, upon receipt of a control request for a setting operation from the second management computer, is configured to:

update the second hierarchy information based on the control request and transmit notified information that indicates the change of the correspondence between the first storage areas and the second storage areas to the first storage system, and wherein the first storage system is configured to, upon receipt of the notified information, update the first hierarchy information based on the notified information.

3. The computer system according to claim 1, wherein the first storage system determines whether the given first storage area constituting the object of the control request corresponds to the virtual storage area, and executes the control request when the given first storage area does not correspond to the virtual storage area.

4. The computer system according to claim 1, wherein the first hierarchy information includes level attribute information assigned to each of the first storage areas, and wherein the first storage system, based on the correspondence in the first hierarchy information, determines whether a given first storage area constituting an object of the control request received by the first management computer corresponds to the virtual storage area, and upon determination that the given first storage area corresponds to the virtual storage area, accesses the level attribute information of the first hierarchy information, while upon determination that the given first storage area requires no approval of the second manager of the second storage system, executes the control request.

5. The computer system according to claim 1, wherein the first storage system has authorization definition information for setting the correspondence between a type of the control request received from the first management computer and an operational authorization granted to the first manager to operate the first management computer, and wherein the first storage system, before executing the control request received by the first management computer, accesses the authorization definition information and determines whether the first manager is authorized to perform an operation included in the control request for the given first storage area, and upon determination that the first manager is so authorized, executes the control request.

6. The computer system according to claim 1, wherein the first storage system has manager identification information registered in the form of correspondence between the plurality of first managers of the first management computer and at least one operational authorizations granted to the first manager, and wherein the first storage system, upon receipt of the control request from the first management computer and determines whether the first manager is registered in the manager identification information or not, and, when the first manager is not so registered, the first storage system transmits an instruction to the first management computer to reject the control request.

7. The computer system according to claim 6, wherein the first storage system, upon receipt of the identification information of the first manager and the control request for setting the first storage system, determines whether the first manager is registered in the manager identification information and also whether a storage area corresponding to the virtual storage area exists in the first storage system, and upon determination that the storage area corresponding to the virtual storage area is not existent in the first storage system, executes the control request.

8. The computer system according to claim 7, wherein, when the storage area corresponding to the virtual storage area is existent in the first storage system, wherein the first storage system transmits to the second storage system the approval request to approve the control request for setting the first storage system, wherein the second storage system receives the approval request, and based on the information from the second management computer used by the second manager managing the virtual storage area associated with the approval request, transmits the contents of the response to the approval request, and wherein the first storage system receives the contents of the response and processes the control request in accordance with the contents of the response.

9. The computer system according to claim 1, wherein the second storage system, upon receipt of a control request from the second management computer to set the correspondence of another first storage area of the plurality of first storage areas in the first storage system to a lower level than another virtual storage area in the second storage system, transmits a setting instruction to the first storage system to set the correspondence of the another first storage area to a lower level than the another virtual storage area in the second storage system, and wherein the first storage system updates the hierarchy information based on the setting instruction.

10. A first storage system coupled to a second storage system and a first management computer and comprising a plurality of first storage areas for storing data, the second storage system coupled to a computer, the first storage system and a second management computer and providing one of the first storage areas of the first storage system to the computer as a virtual storage area, the first storage system comprising:

a processing unit; and the plurality of first storage areas, wherein the first management computer is coupled to the first storage system and controls the first storage system and data stored in the first storage areas, wherein the second management computer is coupled to the second storage system and controls the second storage system and the data stored in the virtual storage area, wherein the first storage system is configured to store first hierarchy information that indicates a correspondence between the first storage areas and the second storage areas, wherein the second storage system is configured to store second hierarchy information that indicates a correspondence between the second storage areas and the first storage areas, wherein the first management computer is configured to transmit identification information of a first manager managing the first storage system and a control request for a setting operation to a given first storage area of the first storage areas to the first storage system, the setting operation being an operation to change the correspondence between a first storage area and a second storage area, wherein the first storage system is configured to receive the identification information of the first manager and the control request from the first management computer, and to determine whether the given first storage area, constituting an object of the control request, is associated with the virtual storage area based on the first hierarchy information, and when the given first storage area is determined to be associated with the virtual storage area, then the first storage system is configured to transmit an approval request to the second storage system to request approval to execute the setting operation which is the subject of the control request wherein the second storage system is configured to receive the approval request, and to transmit the approval request to the second management computer to request a second manager having an approval role to approve the execution of the setting operation, wherein the second management computer is configured to transmit to the second storage system a response to the approval request, the response indicating whether or not execution of the setting operation is approved, and wherein the first storage system is configured to receive the response from the second storage system, and if the response indicates approval of the setting operation, the first storage system is configured to execute the setting operation which is the subject of the control request, otherwise the first storage system is configured to reject the control request for the setting operation.

11. The first storage system according to claim 10, wherein a control request is executed when the first storage system permits the control request for the given first storage area based on the contents of the response to the approval request.

12. The first storage system according to claim 10, wherein an instruction to reject a control request is transmitted to the first management computer when the first storage system fails to permit the control request for the given first storage area based on the contents of the response to the approval request.

13. An access control method for a first storage system, coupled to a second storage system and a first management computer, and comprising a plurality of first storage areas for storing data, the second storage system coupled to a computer and a second management computer and providing one of the first storage areas of the first storage system to the computer as a virtual storage area, the access control method comprising:

wherein the first management computer is coupled to the first storage system and controls the first storage system and data stored in the first storage areas, wherein the second management computer is coupled to the second storage system and controls the second storage system and the data stored in the virtual storage area, wherein the first storage system is configured to store first hierarchy information that indicates a correspondence between the first storage areas and the second storage areas, wherein the second storage system is configured to store second hierarchy information that indicates a correspondence between the second storage areas and the first storage areas, wherein the first management computer is configured to transmit identification information of a first manager managing the first storage system and a control request for a setting operation to a given first storage area of the first storage areas to the first storage system, the setting operation being an operation to change the correspondence between a first storage area and a second storage area, wherein the first storage system is configured to receive the identification information of the first manager and the control request from the first management computer, and to determine whether the given first storage area, constituting an object of the control request, is associated with the virtual storage area based on the first hierarchy information, and when the given first storage area is determined to be associated with the virtual storage area, then the first storage system is configured to transmit an approval request to the second storage system to request approval to execute the setting operation which is the subject of the control request wherein the second storage system is configured to receive the approval request, and to transmit the approval request to the second management computer to request a second manager having an approval role to approve the execution of the setting operation, wherein the second management computer is configured to transmit to the second storage system a response to the approval request, the response indicating whether or not execution of the setting operation is approved, and wherein the first storage system is configured to receive the response from the second storage system, and if the response indicates approval of the setting operation, the first storage system is configured to execute the setting operation which is the subject of the control request, otherwise the first storage system is configured to reject the control request for the setting operation.

14. The access control method according to claim 13, wherein a control request is executed when the first storage system permits the control request for the given first storage area based on the contents of the response to the approval request.

15. The access control method according to claim 13, wherein an instruction to reject a control request is transmitted to the first management computer when the first storage system fails to permit the control request for the given first storage area based on the contents of the response to the approval request.

16. The access control method according to claim 13, wherein if the first management computer requests the first storage area which is provided as a virtual storage area of the second storage system, the first storage system transmits an authorization request for deleting the data to the second storage system.

* * * * *